United States Patent
Ikeda et al.

(10) Patent No.: US 11,687,302 B2
(45) Date of Patent: Jun. 27, 2023

(54) IMAGE FORMING APPARATUS, METHOD OF CONTROLLING IMAGE FORMING APPARATUS, AND STORAGE MEDIUM

(71) Applicant: CANON KABUSHIKI KAISHA, Tokyo (JP)

(72) Inventors: Atsushi Ikeda, Ibaraki (JP); Takeshi Kogure, Ibaraki (JP); Hiroaki Koike, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/579,178

(22) Filed: Jan. 19, 2022

(65) Prior Publication Data

US 2022/0236929 A1    Jul. 28, 2022

(30) Foreign Application Priority Data

Jan. 28, 2021  (JP) ................. 2021-011931

(51) Int. Cl.
*G06F 3/12* (2006.01)

(52) U.S. Cl.
CPC ............ *G06F 3/126* (2013.01); *G06F 3/1204* (2013.01); *G06F 3/1205* (2013.01)

(58) Field of Classification Search
None
See application file for complete search history.

(56) References Cited

U.S. PATENT DOCUMENTS

| 2013/0235402 A1* | 9/2013 | Yamamichi ........... G06F 3/1205 |
| | | 358/1.13 |
| 2017/0156024 A1* | 6/2017 | Shigaki ................... H04W 4/80 |
| 2019/0056135 A1* | 2/2019 | Yasufuku .............. G06F 3/0625 |

FOREIGN PATENT DOCUMENTS

JP    2019089287 A    6/2019

* cited by examiner

*Primary Examiner* — Frantz Bataille
(74) *Attorney, Agent, or Firm* — Canon U.S.A., Inc. IP Division

(57) ABSTRACT

An image forming apparatus is provided on which an application including a first module and a second module is installed. The first module is configured to determine whether to activate the second module based at least on a time set by a user, and activate the second module based on the first module determining to activate the second module. The second module is configured to cause the image forming apparatus to perform printing. In addition, the image forming apparatus includes an activation unit configured to activate the first module without activating the second module, periodically at each elapse of a predetermined time interval. In a case where it is determined that the second module is to be activated before a time when the first module is to be activated next, the first module is configured to set a timing to activate the second module.

11 Claims, 32 Drawing Sheets

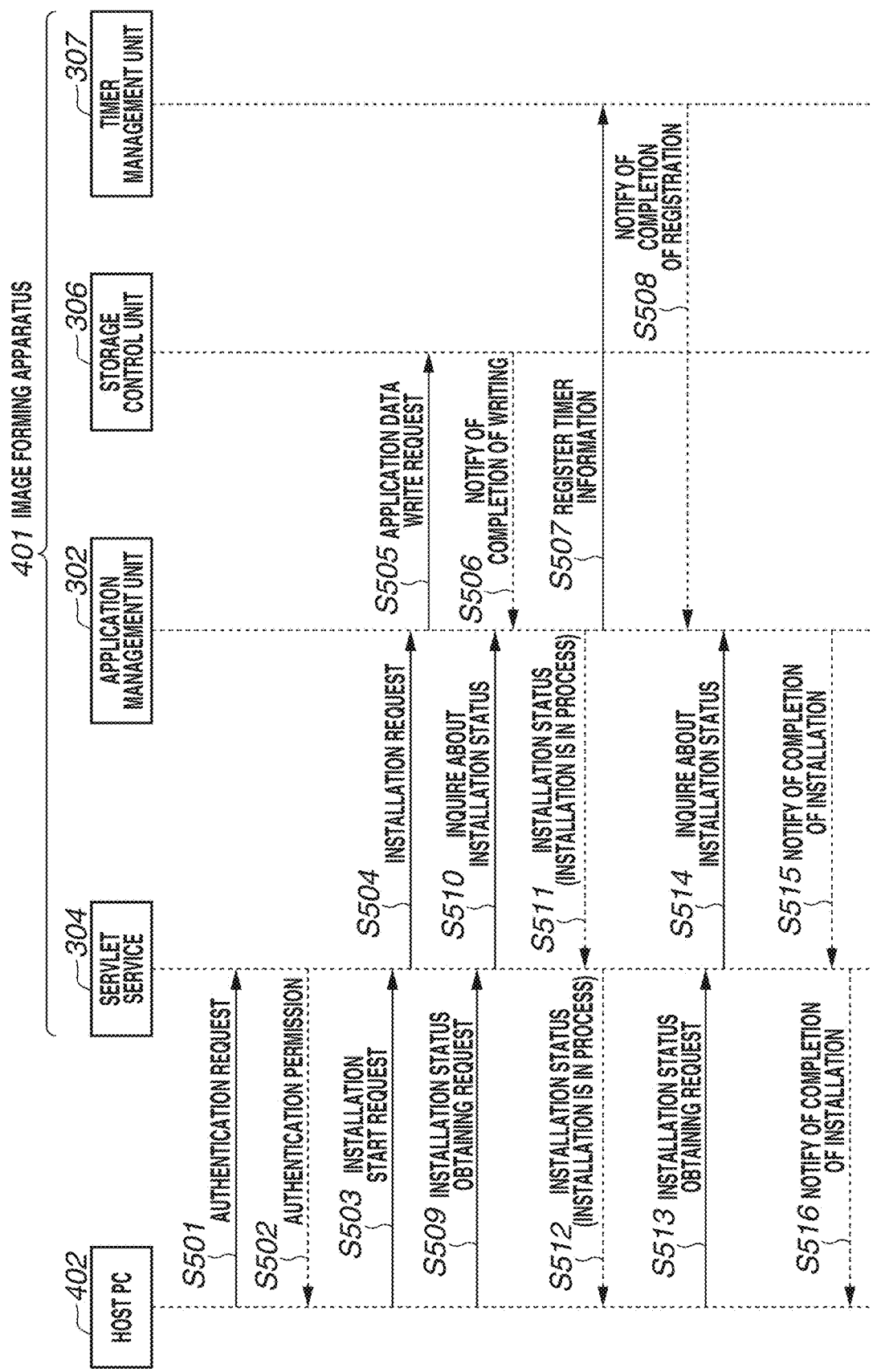

FIG.6

REGISTER NEW BUTTON    602 — OK   CANCEL — 603

DETAILED INFORMATION ABOUT BUTTON

BASIC SETTINGS

BUTTON NAME:   [CONTENT PRINTING] — 604   (UP TO 20 CHARACTERS)

FILE PATH INFORMATION:
- ○ URL: [ ]
- ● FOLDER PATH: [\smbpath\print\]

— 605

☑ DISPLAY CONFIRMATION SCREEN BEFORE EXECUTION — 606

PRINT SETTINGS

- SHEET SIZE: A4
- DUPLEX PRINTING: ● ON   ○ OFF
- COLOR MODE: AUTO (COLOR/AUTO)
- NUMBER OF COPIES: 1 (1 – 999)
- SHEET FEED UNIT: CASSETTE 1

— 607

SCHEDULE SETTINGS

☑ SET SCHEDULE — 608

| Day | Hour | Min | AM/PM |
|---|---|---|---|
| SUNDAY: | 1 | 30 | AM |
| MONDAY: | 5 | 45 | PM |
| TUESDAY: | | | AM |
| WEDNESDAY: | | | AM |
| THURSDAY: | | | AM |
| FRIDAY: | | | AM |
| SATURDAY: | | | AM |

— 609

— 601

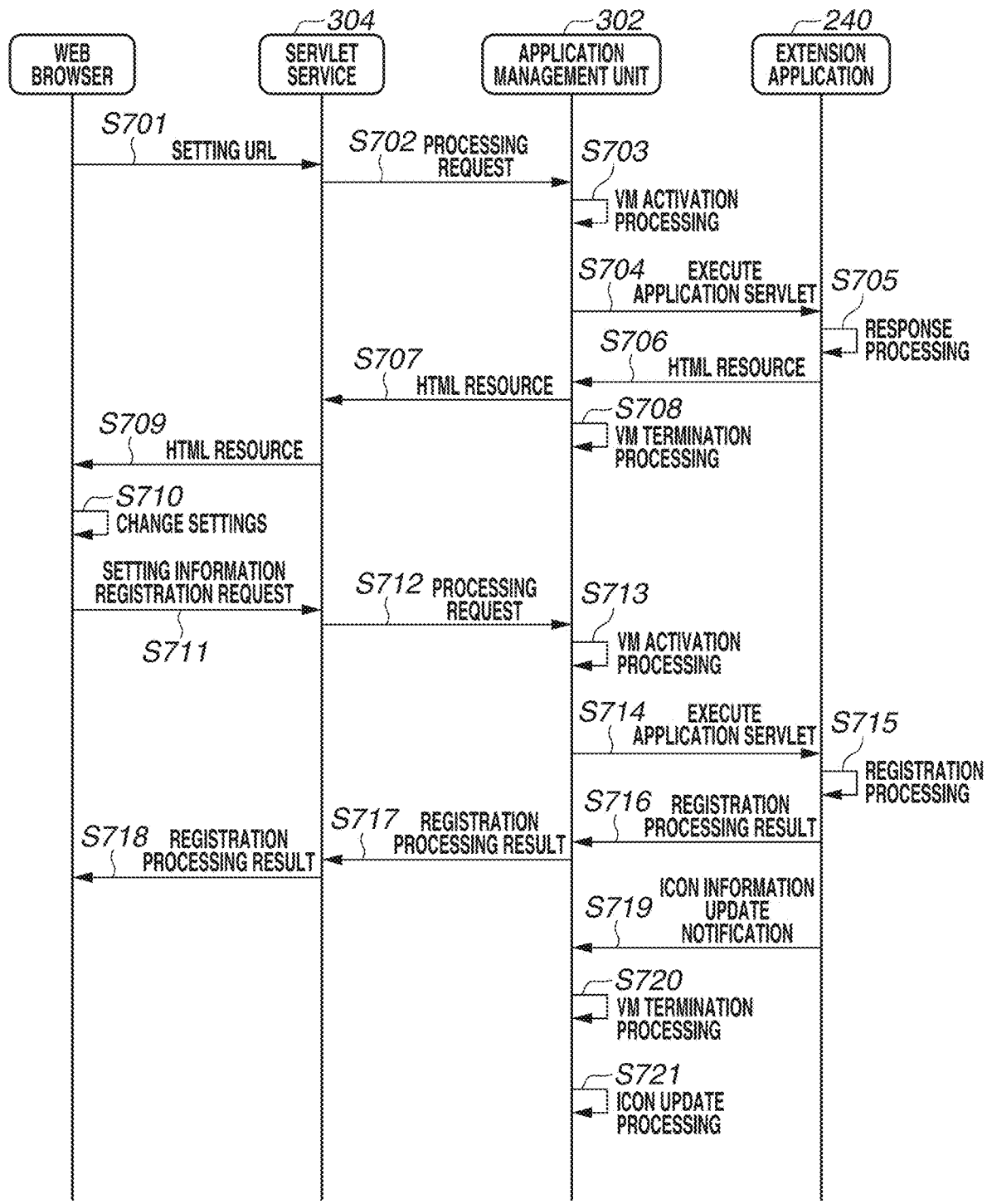

FIG.11

```
        {
1101 ~  "appId": 1,
1102 ~  "title": "print form",
1103 ~  "intervalTime": 10,
        }
```

FIG.12

| Application ID | interval |
|---|---|
| 1 | 10 |
| 2 | 10 |
| 5 | 20 |

```
{
  "input_file_list": [
    "file1.pdf",
    "file2.pdf"
  ]
}
```

FIG.32

| APPLICATION ID | TIMER NUMBER |
|---|---|
| 1 | 007e |
| 2 | 007f |
| 5 | 0080 |

IMAGE FORMING APPARATUS, METHOD OF CONTROLLING IMAGE FORMING APPARATUS, AND STORAGE MEDIUM

BACKGROUND

Field

The present disclosure relates to an image forming apparatus, a method of controlling the image forming apparatus, and a storage medium.

Description of the Related Art

Some applications installed on an image forming apparatus perform printing based on print data obtained from an external apparatus at a timing when a condition is met. For example, as discussed in Japanese Patent Application Laid-Open No. 2019-89287, there has been known an image forming apparatus that starts printing based on print data obtained from an external apparatus at a user-specified date and time.

When such applications are installed on the image forming apparatus, the image forming apparatus can start printing at a previously specified timing without the user giving a print start instruction at the timing to start the printing.

An application for starting processing at a user-set time or timing is typically always loaded in memory, and a control module in the application determines whether the user-set time or timing has come. The application then starts processing of performing printing based on the time reaching the set time or the user-set timing arriving.

The foregoing application is stored in memory all the time even if programs related to data printing are not always running. In other words, programs related to data printing occupy memory even at a timing when the application is not printing.

SUMMARY

According to various embodiments of the present disclosure, an image forming apparatus is provided on which an application including a first module and a second module is installed. The first module is configured to determine whether to activate the second module based at least on a time set by a user, and activate the second module based on the first module determining to activate the second module. The second module is configured to cause the image forming apparatus to perform printing. In addition, the image forming apparatus includes an activation unit configured to activate the first module without activating the second module, periodically at each elapse of a predetermined time interval. In a case where it is determined that the second module is to be activated before a time when the first module is to be activated next, the first module is configured to set a timing to activate the second module.

Further features of the present disclosure will become apparent from the following description of example embodiments with reference to the attached drawings.

BRIEF DESCRIPTION OF THE DRAWINGS

FIG. 5 is a sequence diagram illustrating processing of installing an extension application on the image forming apparatus according to the present example embodiment.

FIG. 6 illustrates a setting screen example of the extension application according to the present example embodiment.

FIG. 7 is a sequence diagram illustrating processing related to the setting of the extension application according to the present example embodiment.

FIG. 11 illustrates a meta information example about the extension application according to the present example embodiment.

FIG. 12 is a chart illustrating an example of interval information managed by a timer management unit 307 according to the present example embodiment.

FIG. 22 illustrates a suspension information example about the extension application according to the present example embodiment.

FIG. 32 illustrates a management table example of application IDs and timer numbers according to one embodiment.

DESCRIPTION OF THE EMBODIMENTS

Various embodiments for carrying out features of the present disclosure will be described below with reference to the drawings.

Figure 1:
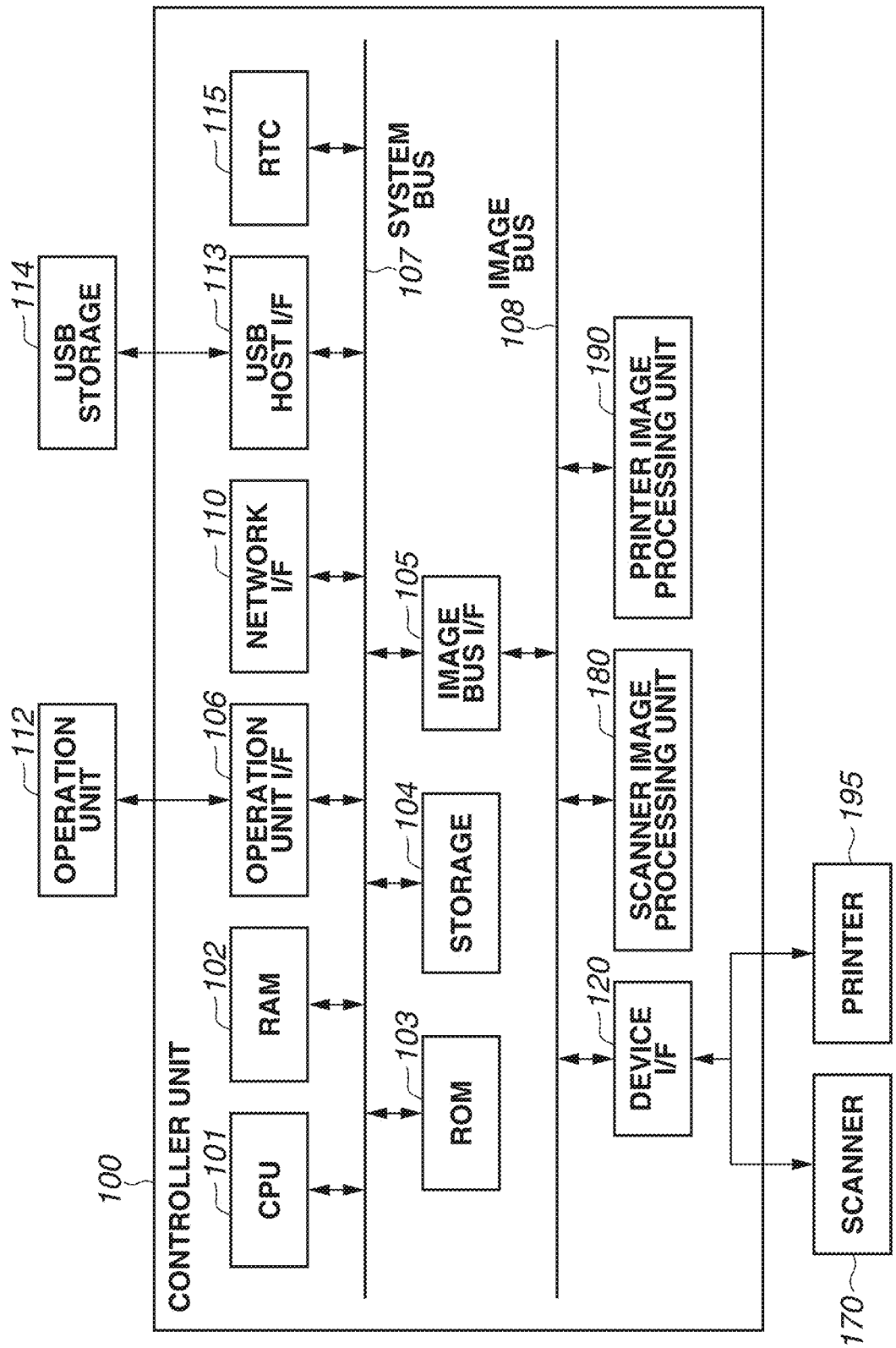
FIG. 1 is a diagram illustrating a hardware configuration example of an image forming apparatus according to an example embodiment.

FIG. 1 is a block diagram illustrating an example configuration of main components of an image forming apparatus 401. The image forming apparatus 401 includes a controller unit 100. The controller unit 100 is connected to a scanner 170 as an image input device, a printer 195 as an image output device, and an operation unit 112. The controller unit 100 controls a copy function of printing image data read by the scanner 170 and outputting the printed product using the printer 195.

A central processing unit (CPU) 101 starts an operation system (OS) by running the boot program stored in a read-only memory (ROM) 103. The CPU 101 runs programs stored in a storage 104 on the OS, and thereby performs various types of processing. The CPU 101 uses a random access memory (RAM) 102 as its work area. The RAM 102 provides the work area as well as an image memory area for temporarily storing image data. The storage 104 stores programs and image data.

The CPU 101 is connected to the ROM 103 and the RAM 102 via a system bus 107. The CPU 101 is also connected to an operation unit interface (I/F) 106, a network I/F 110, a Universal Serial Bus (USB) host I/F 113, and an image bus I/F 105. The operation unit I/F 106 is an I/F with the operation unit 112 including a touch panel, and outputs image data to be displayed on the operation unit 112 to the operation unit 112. The operation unit I/F 106 also transmits information input by a user from the operation unit 112 to the CPU 101. The network I/F 110 is an I/F to connect the image forming apparatus 401 to a local area network (LAN).

The USB host I/F 113 is an I/F unit to communicate with a USB storage 114. The USB host I/F 113 also serves as an output unit to store data stored in the storage 104 into the USB storage 114. The USB host I/F 113 also inputs data stored in the USB storage 114 and transmits the data to the CPU 101. The USB storage 114 is an external storage device to storing data, and can be detachably attached to the USB host I/F 113. Two or more USB devices including the USB storage 114 can be connected to the USB host I/F 113.

A real-time clock (RTC) 115 controls current time information. The current time information controlled by the RTC 115 is used to record job submission time and for other purposes.

The image bus I/F 105 is a bus bridge to connect the system bus 107 to an image bus 108 to transmit image data with high speed, and converting data formats. The image bus 108 includes a Peripheral Component Interconnect (PCI) bus or an Institute of Electrical and Electronics Engineers (IEEE) 1394 bus. A device I/F 120, a scanner image processing unit 180, and a printer image processing unit 190 are arranged on the image bus 108. The device I/F 120 is connected to the scanner 170 and the printer 195. The device I/F 120 performs synchronous or asynchronous conversion of image data. The scanner image processing unit 180 corrects, processes, and edits input image data. The printer image processing unit 190 performs correction and resolution conversion suited to the printer 195 on print output image data.

Figure 2:
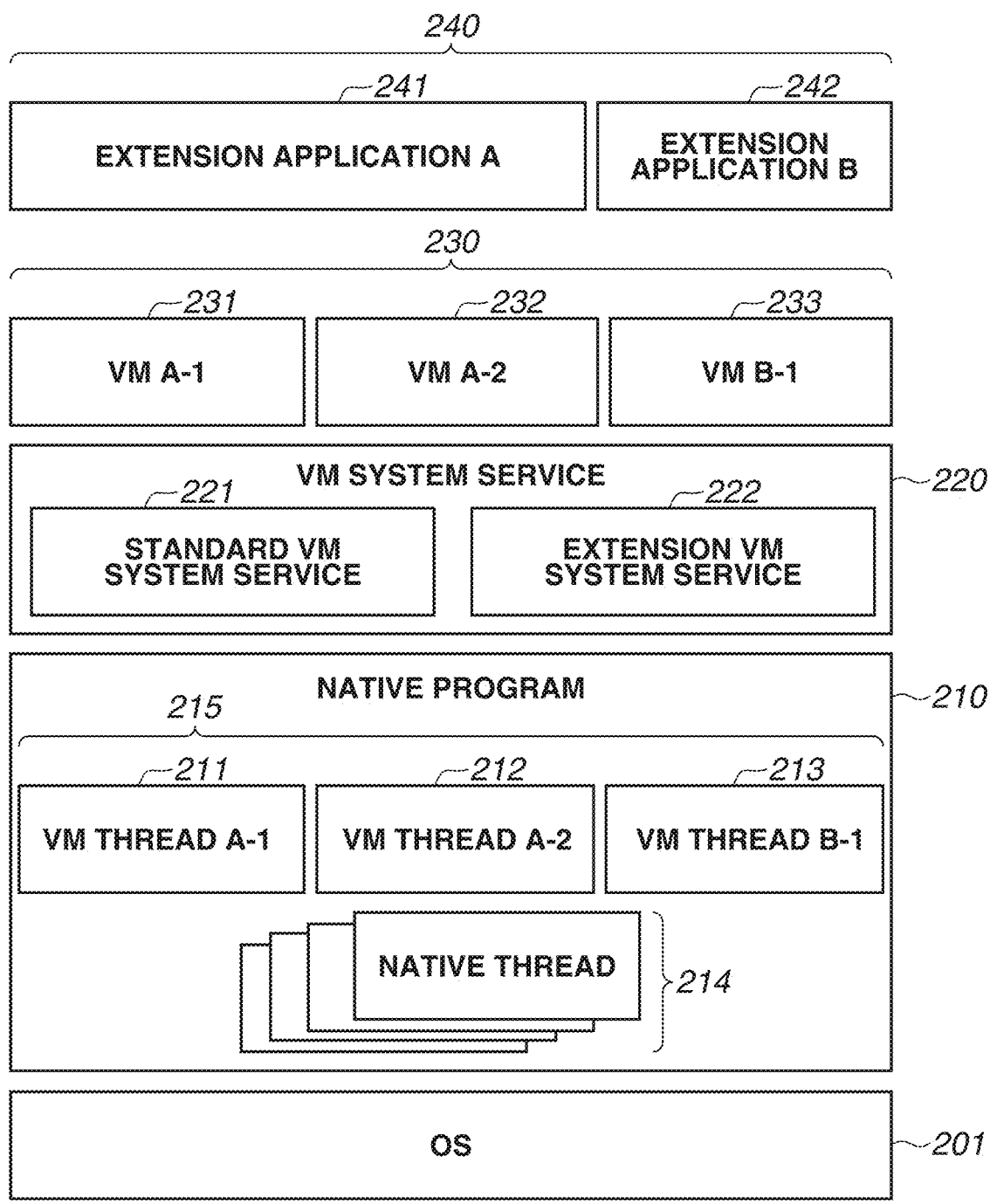
FIG. 2 is a diagram illustrating a software configuration example of the image forming apparatus according to the present example embodiment.

FIG. 2 is a software block diagram illustrating an operational environment for extension applications on the image forming apparatus 401. In the present example embodiment, extension applications refer to applications of implementing functions other than basic functions of the image forming apparatus 401 such as a copy, facsimile (FAX), and print functions.

Examples of the functions include a function of accessing a user-set address, folder path, or file path at a user-specified time, downloading data identified by the address, folder path, or file path, and printing the data.

The modules illustrated in FIG. 2 are implemented by the CPU 101 loading programs stored in the storage 104 into the RAM 102 and running the programs.

A native program 210 for controlling image processing units such as the printer 195, a FAX, and the scanner 170 runs on an OS 201. Virtual machines (VM) 230 to provide an operational environment for extension applications also run on the OS 201. The VMs 230 are modules to decode and run programs for controlling extension applications. Extension applications run on the VMs 230.

Unlike commands executed by the CPU 101, the programs running on the VMs 230 operate with commands dedicated to the VMs 230. Such commands are referred to bytecodes. By contrast, commands dedicated to the CPU 101 are referred to as native codes. One type of VMs directly decode bytecodes in succession. The other type of VMs convert bytecodes into native codes to execute.

The VMs 230 according to the present example embodiment are of the former type, but may be of the latter type. As one type of CPU is typically unable to use instructions operable on another type of CPU, one type of VMs is unable to use instructions to operate another type of VMs. The VMs 230 according to the present example embodiment are software modules running on the CPU 101, whereas the VMs 230 may be hardware modules.

The native program 210 includes native threads 214 to control image processing units such as the printer 195, the FAX, and the scanner 170, and VM threads 215 to run the VMs 230. The native program 210 includes as many VM threads 215 as the VMs 230. Three VM threads 211, 212, and 213 here are generated.

A VM system service 220 is a utility library to be shared by extension applications 240. Calling functions of the VM system service 220 from the extension applications 240 can lead to a reduction of labor of developing the extension applications 240 or enable access to modules of the image forming apparatus 401. The VM system service 220 includes a standard VM system service 221 as a minimum VM system service for the VMs 230 to run, and an extension VM system service 222, which provides OS functions and access to modules of the image forming apparatus 401. The standard VM system service 221 also has a function of loading the extension applications 240. A VM 230 runs an application programming interface (API) specified by a bytecode included in an extension application 240, calling a VM system service 220 associated with the API.

The VMs 230 run the extension applications 240. The VMs 230 are generated for respective threads of the extension applications 240. In the drawing, a VM A-1 231 and a VM A-2 232 to run two threads of an extension application A 241, and a VM B-1 233 to run one thread of an extension application B 242.

The extension applications 240 illustrated in FIG. 2 are activated by the following manner. The operation unit I/F 106 detects the selection of an extension application icon displayed on the main menu screen of the operation unit 112 of the image forming apparatus 401 by the user. The operation unit I/F 106 then notifies the CPU 101 of the selection of the extension application icon. The CPU 101 activates the extension application 240 selected by the user based on the notification from the operation unit I/F 106.

Figure 3:
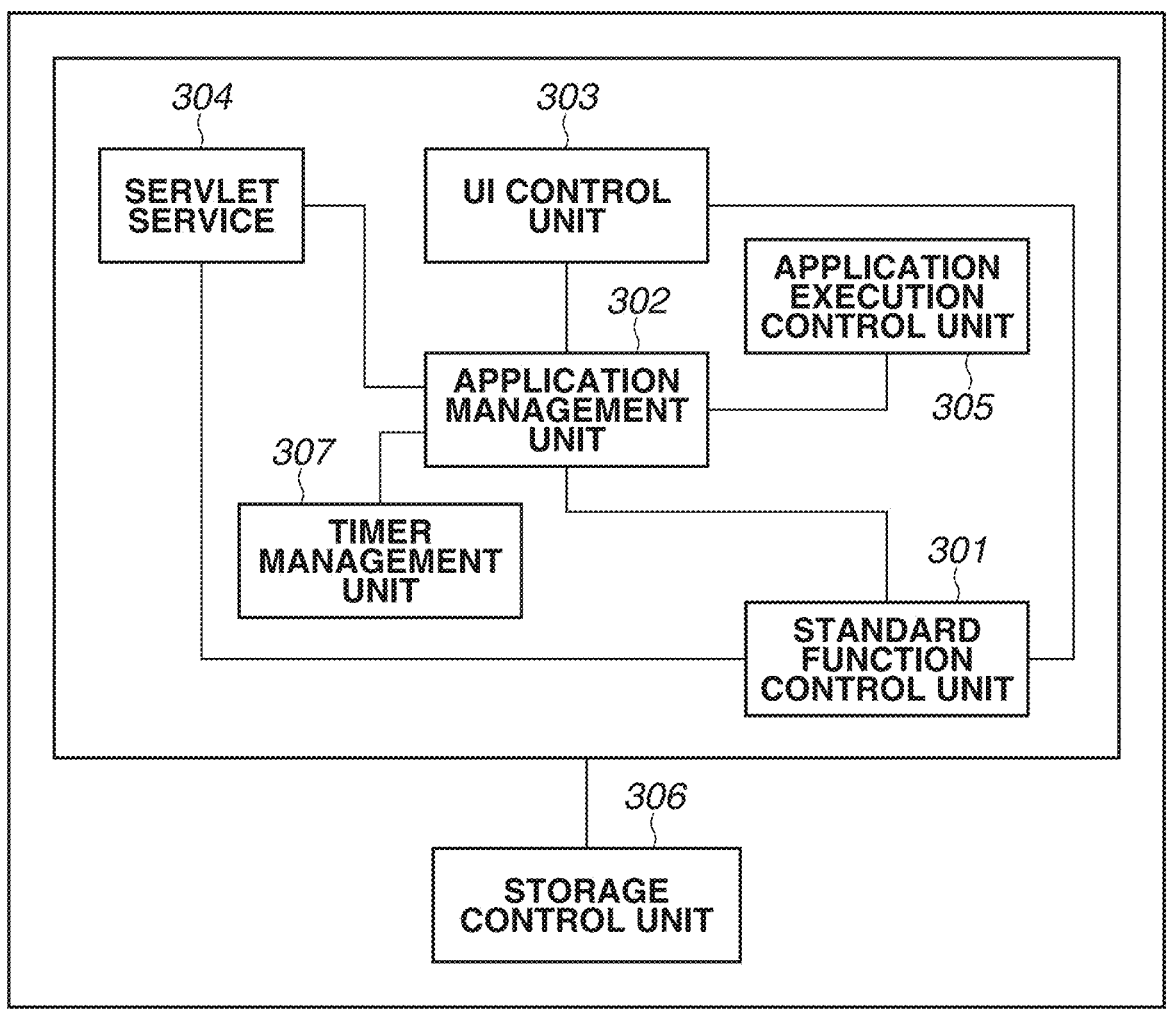
FIG. 3 is a diagram illustrating examples of software modules according to the present example embodiment.

FIG. 3 is a block diagram of software modules run by the CPU 101 of the image forming apparatus 401 according to the present example embodiment. The native threads 214 perform processing with the modules illustrated in FIG. 3.

A servlet service 304 accepts the request if a Hypertext Transfer Protocol (HTTP) access is made via the network I/F 110, and allocates processes to modules (application management unit 302 and standard function control unit 301).

A user interface (UI) control unit 303 displays a screen on the operation unit 112, accepts the user's operation, and notifies an appropriate module (application management unit 302 or standard function control unit 301) of operation information about the operation.

The application management unit 302 manages installation and activation of the extension applications 240.

An application execution control unit 305 controls the execution of applications activated by the application management unit 302. Specifically, the application execution control unit 305 controls the VM threads 215, the VM system service 220, the VMs 230, and the extension applications 240.

A storage control unit 306 records the programs of and setting information about the extension applications 240.

The application execution control unit 305 accesses the storage control unit 306 and reads programs of the extension applications 240.

Each module accesses the storage control unit 306, and refers to and sets setting values.

The standard function control unit 301 controls the standard functions of the image forming apparatus 401, such as the copy function and the FAX function, and controls the image forming apparatus (for example, controls the USB host I/F 113).

A timer management unit 307 obtains current time information from the RTC 115, detects a lapse of a predetermined time, and issues a notification to the application management unit 302. Receiving the notification from the timer management unit 307, the application management unit 302 requests the application execution control unit 305 to perform timer processing of the application.

Figure 4:
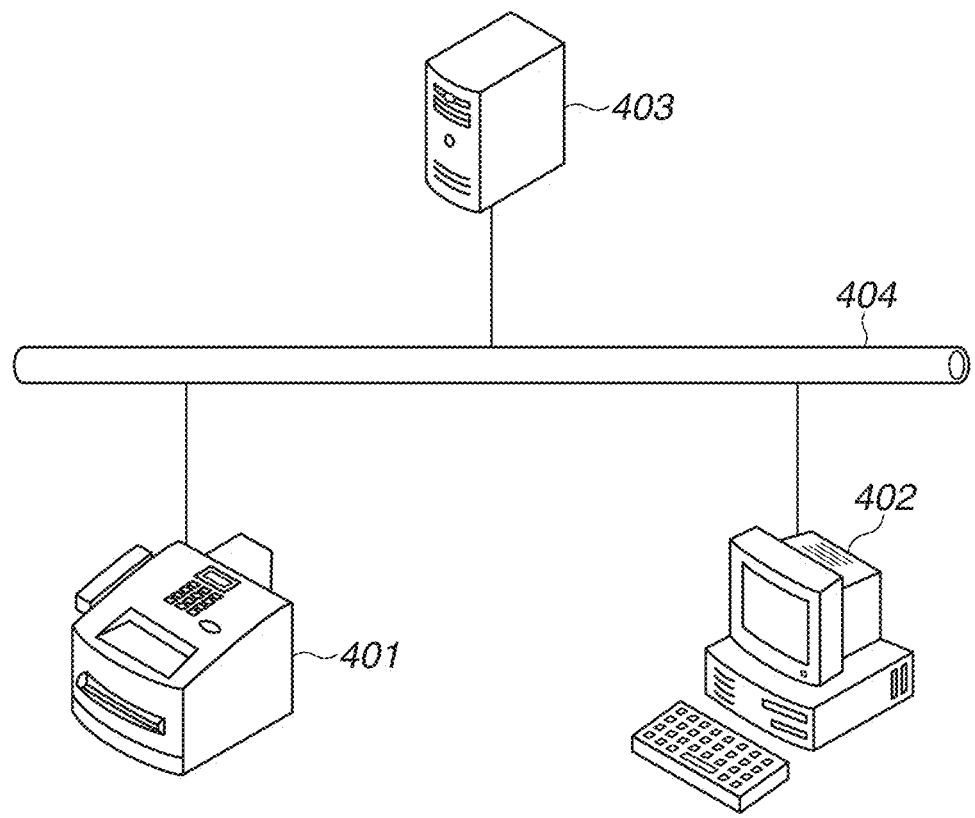
FIG. 4 is a diagram illustrating a system configuration example according to the present example embodiment.

FIG. 4 is a diagram illustrating an example of a configuration of a printing system including the image forming apparatus 401 according to the present example embodiment. This printing system includes the image forming apparatus 401, a host personal computer (PC) 402, a server 403, and an Ethernet® network 404.

The extension applications 240 are installed on the image forming apparatus 401 by the host PC 402 via the Ethernet® network 404. The host PC 402 stores installation data on the extension applications 240, and installs the extension applications 240 on the image forming apparatus 401 by using an extension application installation unit provided by the image forming apparatus 401. The server 403 stores image data to be printed, and transmits the image data to the image forming apparatus 401 in response to an image data obtaining request from the image forming apparatus 401.

In the present example embodiment, the extension applications 240 installed on the image forming apparatus 401 are applications to access a specified folder on the server 403 at a user-specified time, obtain print data, and perform printing based on the print data. In addition, if the user selects an icon of an extension application 240 on the main menu screen and gives an instruction to perform printing, the extension applications 240 perform the printing.

A procedure of installing an extension application 240 on the image forming apparatus 401 will be described first.

FIG. 5 is a sequence diagram illustrating processing in installing installation data on an extension application 240 stored in the host PC 402 on the image forming apparatus 401. This processing is started by the host PC 402 accessing the image forming apparatus 401.

In step S501, the host PC 402 transmits an authentication request to the image forming apparatus 401. The host PC 402 accesses the image forming apparatus 401 using a web browser function. The user enters predetermined information (such as a user identifier (ID) and a password) into an authentication screen provided by the image forming apparatus 401, and the host PC 402 transmits the information. In such a manner, the authentication request and the information to be used in authentication (authentication information) are transmitted to the image forming apparatus 401.

In step S502, after receiving the authentication request, the servlet service 304 performs authentication based on the received authentication information, and responds to the host PC 402. In step S502, the servlet service 304 passes the received authentication information to a not-illustrated authentication module, and receives the authentication result from the authentication module. The servlet service 304 then returns the authentication result to the host PC 402. Here, the servlet service 304 returns a token representing authentication permission issued by the authentication module to the host PC 402 along with the authentication result.

In step S503, after receiving the authentication permission, the host PC 402 transmits an installation start request to the image forming apparatus 401. Here, the host PC 402 transmits the installation data on the corresponding extension application 240 stored in the host PC 402 and the token obtained in step S502 to the servlet service 304.

In step S504, after receiving the installation start request, the servlet service 304 checks the authenticity of the token. The servlet service 304 then transmits an installation request for the extension application 240 to the application management unit 302. In step S504, the servlet service 304 passes the installation data on the extension application 240 received from the host PC 402 to the application management unit 302.

In step S505, in response to the receipt of the installation request, the application management unit 302 transmits an application data write request to the storage control unit 306. The storage control unit 306 receives the application data write request, and writes application data to the storage 104.

After the completion of the writing of the application data to the storage 104, in step S506, the storage control unit 306 notifies the application management unit 302 of the completion of the writing.

In step S507, the application management unit 302 registers timer information included in the installation data in the timer management unit 307.

In step S508, the timer management unit 307 completes registering the timer information, and notifies the application management unit 302 of the completion of the registration. The timer information will be described below with reference to FIG. 12. Finishing the processing up to step S508 completes the installation of the extension application 240 on the image forming apparatus 401.

In step S509, while the extension application 240 is being installed on the image forming apparatus 401, the host PC 402 notifies the image forming apparatus 401 of an installation status obtaining request. Here, in the notification, the host PC 402 uses the token obtained in step S502.

The servlet service 304 checks the authenticity of the received token. If the token is authentic, then in step S510, the servlet service 304 inquires of the application management unit 302 about the installation status. In response to the reception of the inquiry, the application management unit 302 returns the current installation status. In step S511, since the installation of the extension application 240 is not completed and still in process, the application management unit 302 returns an installation status indicating that the installation is in process. In step S512, the servlet service 304 notifies the host PC 402 of the installation state obtained from the application management unit 302.

In steps S513 to S516, the host PC 402 checks the installation status again. Since the installation has been completed, the host PC 402 is notified of the completion of the installation here. The checking of the installation status in step S509 and the subsequent steps is carried out by polling processing performed at predetermined intervals. The image forming apparatus 401 notifies the host PC 402 that the installation is in process until the installation is completed. After the installation is completed, the host PC 402 is notified of the completion of the installation.

The above processing installs the installation data on the extension application 240 stored in the host PC 402 on the image forming apparatus 401.

Figure 10:
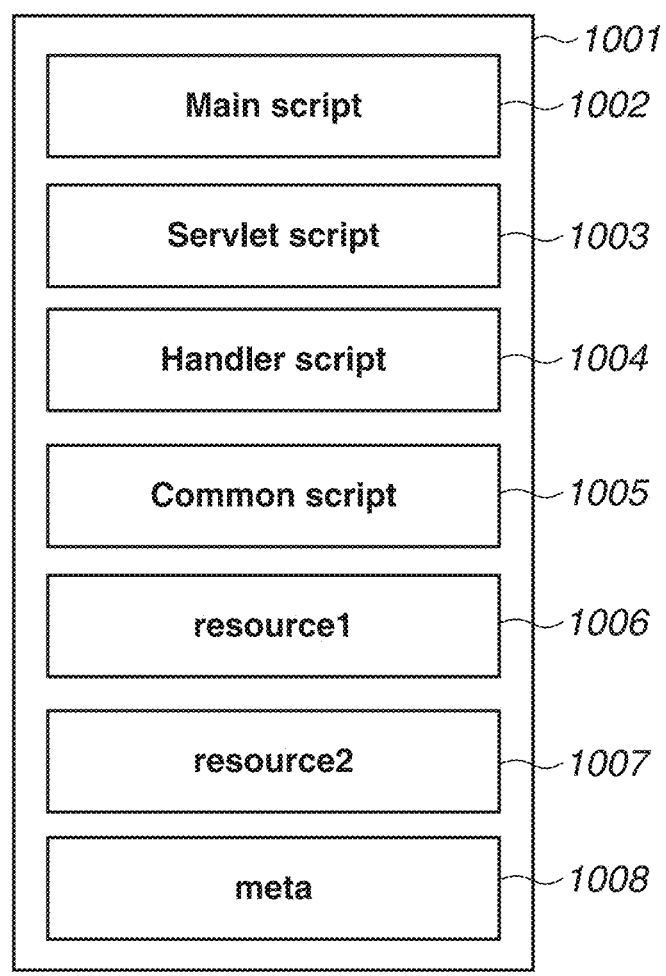
FIG. 10 illustrates a configuration example of installation data on the extension application according to the present example embodiment.

Now, a configuration of the installation data on the extension application 240 to be installed on the image forming apparatus 401 will be described. FIG. 10 illustrates a configuration example of the installation data on the extension application 240.

An archive 1001 is a single set of all the data constituting the extension application 240. Files constituting the extension application 240 are broadly divided into three types. A first type includes scripts (1002 to 1005) describing operations of the extension application 240 in a programming language. A second type includes resource files (1006 and 1007) containing image data and display messages to be used by the extension application 240. A third type includes a meta file 1008 declaring an application name. The archive 1001 includes a plurality of scripts. Examples include a main script 1002 describing an operation when an icon displayed on the operation unit 112 is pressed, a servlet script 1003 to perform the processing by the servlet service 304, and a handler script 1004 to perform timer processing. The archive 1001 further stores a common script 1005 to be shared by the foregoing scripts. In execution of the extension application 240, a script or scripts to be used are loaded into the memory (RAM 102), reducing useless memory consumption.

FIG. 11 illustrates an example of the metal file 1008 included in the extension application 240. An ID 1101 identifies the extension application 240. An application name 1102 describes an application name. An interval 1103 describes the interval of timer handler processing of the extension application 240 to be regularly activated. The meta file 1008 in FIG. 11 indicates that an extension application "print form" with an ID of 1 is activated every 10 minutes to determine whether to perform printing. The interval 1103 is registered in the timer management unit 307 in step S507 of the installation processing.

FIG. 12 is a chart illustrating an example of a table that manages interval information registered in the timer management unit 307. In FIG. 12, the intervals are in units of minutes.

Interval information 1201 indicates that the interval information links the ID (application ID) of an extension application 240 with the interval for the extension application 240. A row 1202 indicates that the interval for the extension application 240 with an application ID of 1 is 10 minutes. A row 1203 indicates that the interval for the extension application 240 with an application ID of 2 is 10 minutes. A row 1204 indicates that the interval for the extension application 240 with an application ID of 5 is 20 minutes. In other words, the image forming apparatus 401 activates the extension applications 240 with an ID of 1 and an ID of 2 at every 10 minutes, and activates the extension application 240 with an ID of 5 at every 20 minutes. The activated extension applications 240 determine whether to perform processing using the main script 1002 of the extension applications 240. In such a manner, timer handlers are activated at predetermined periods (intervals), enabling the processing by the extension applications 240 to be performed at user-specified times without running the respective extension applications 240 all the time.

FIG. 6 illustrates an example of a setting screen 601 for an extension application 240. The setting screen 601 illustrated in FIG. 6 is displayed on the display of the host PC 402 by the host PC 402 accessing the image forming apparatus 401 after the sequence illustrated in FIG. 5 is ended and the extension application 240 is installed on the image forming apparatus 401. The setting screen 601 is displayed on a web browser running on the host PC 401 connected to the image forming apparatus 401 via the Ethernet® network 404.

The setting screen 601 allows a button name 604, file path information 605, and a pre-execution confirmation screen display 606 to be set as basic settings.

The button name 604 is a field for setting the name of an icon to be displayed on the main menu screen of the operation unit 112 on the image forming apparatus 401.

The file path information 605 sets path information about a file to be printed. The file path information 605 may be Universal Resource Locator (URL) information for identifying the file, a path to the folder where the file is stored, or a file path to the file. The image forming apparatus 401 accesses the specified URL, folder path, or file path to obtain print data.

The pre-execution confirmation screen display 606 sets whether to display a pre-execution confirmation screen when the icon displayed on the main menu screen of the operation unit 112 of the image forming apparatus 401 is pressed. It is assumed that even if the pre-execution confirmation screen is set to be displayed, the pre-execution confirmation screen is not displayed in performing printing using a schedule setting to start printing at a user-specified time.

The setting screen 601 also includes items for print settings 607 such as a sheet size, duplex printing, a color mode, the number of copies, and a sheet feed unit. The setting screen 601 thus includes fields for making print settings to be used when the extension application 240 performs printing.

The setting screen 601 allows further schedule settings for performing printing at specified days and times to be made. A setting 608 can set whether to enable the schedule settings. If the setting 608 is checked, settings 609 become settable. With the setting 608 not checked, the settings 609 are not settable.

The settings 609 are fields for setting times for the extension application 240 to perform printing. The user sets days and times for the extension application 240 to perform printing. For example, in FIG. 6, printing is set to be performed at 1:30 a.m. on Sunday and 5:45 p.m. on Monday.

If an "OK" button 602 is pressed on the setting screen 601, the icon linked with the settings made on the setting screen 601 is displayed on the main menu screen of the operation unit 112 of the image forming apparatus 401.

If a "cancel" button 603 is pressed on the setting screen 601, the settings made on the setting screen 601 are discarded and the setting screen 601 is closed.

FIG. 7 is a sequence diagram illustrating processing in displaying the setting screen 601 illustrated in FIG. 6 on the host PC 402 and making settings for the extension application 240. The following description will be given by using an application for printing user-registered form image data as an example of the extension application 240. While processing details vary from application to application, basic processing is similar to the processing of the following steps.

The settings for the extension application 240 are made via the web browser running on the host PC 402 by connecting to the image forming apparatus 401 using the web browser. In some embodiments, the settings are made using a web browser on the image forming apparatus 401.

In step S701, the web browser notifies the servlet service 304 of a setting URL for making the settings for the extension application 240, and requests processing corresponding to the setting URL.

In step S702, the servlet service 304 passes the setting URL notified by the web browser to the application management unit 302, and requests the application management unit 302 to perform processing for displaying the setting screen 601.

In step S703, the application management unit 302 identifies the extension application 240 by the notified setting URL, and performs VM activation processing for the extension application 240.

In step S704, the application management unit 302 executes the application servlet. Here, the application management unit 302 notifies the extension application 240 of the setting URL and information notified by the web browser.

In step S705, the extension application 240 performs response processing to the request for the notified setting URL. Here, the extension application 240 makes preparations to return a HyperText Markup Language (HTML) resource corresponding to the setting URL.

Figure 8:
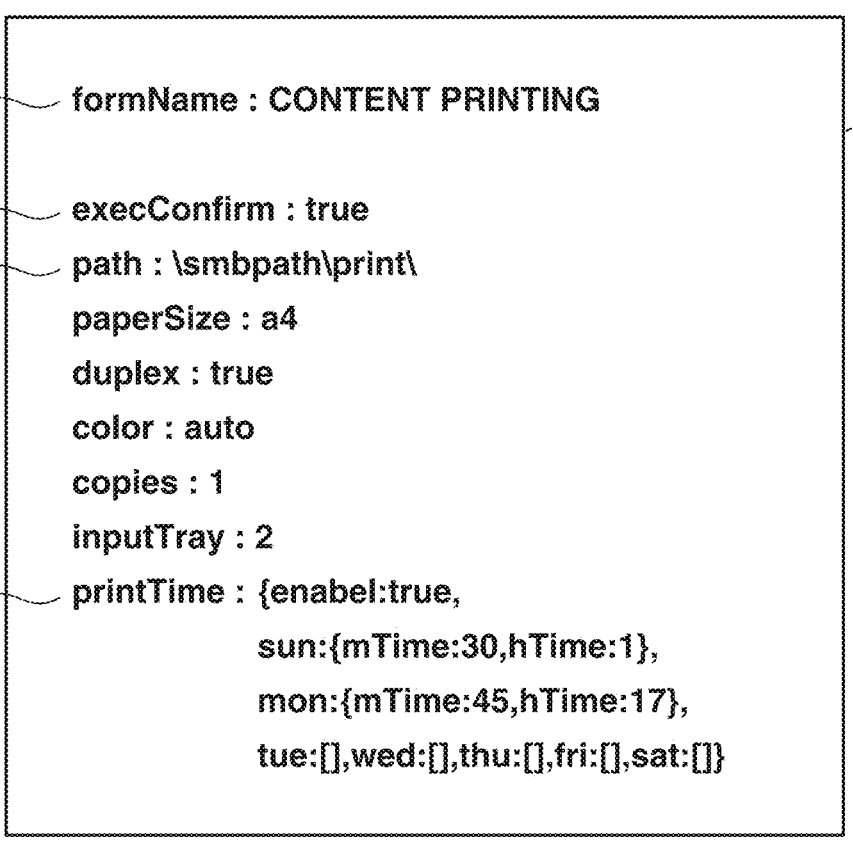
FIG. 8 illustrates a setting data example about the extension application according to the present example embodiment.

This HTML resource describes an HTML form for referring to and setting information for use in form print processing, illustrated in FIG. 8.

In step S706, the extension application 240 transmits the prepared HTML resource to the application management unit 302, and terminates the application servlet.

In step S707, the application management unit 302 transmits the received HTML resource directly to the servlet service 304.

In step S708, the application management unit 302 receives a termination notification from the extension application 240 and performs VM termination processing.

In step S709, the servlet service 304 transmits the HTML resource received from the application management unit 302 to the web browser. The web browser displays a screen based on the HTML resource on the display of the host PC 402, displaying the setting screen 601 illustrated in FIG. 6.

In step S710, the user edits the screen displayed on the web browser to change the settings for the extension application 240. It here is assumed that the user registers a new print form.

In step S711, the web browser issues a setting information registration request to the servlet service 304 based on the user's operation.

In step S712, the servlet service 304 issues a processing request to the application management unit 302 based on the setting information registration request received from the web browser. In step S713, the application management unit 302 receives the setting information registration request from the servlet service 304, identifies the extension application 240 to the setting information registration request, and activates a VM for executing the extension application 240. In step S714, the application management unit 302 executes the application servlet. Here, the application management unit 302 transmits the setting information registration request received from the servlet service 304 and the set information (setting information) to the extension application 240.

In step S715, the extension application 240 performs registration processing of registering the setting information based on the setting information registration request and the setting information received from the application management unit 302. In response to the completion of the registration of the setting information, then in step S716, the extension application 240 notifies the application management unit 302 of a registration processing result indicating the completion of the processing corresponding to the setting information registration request.

In step S717, the application management unit 302 transmits the registration processing result received from the extension application to the servlet service 304 as it is. In step S718, the servlet service 304 transmits the registration processing result received from the application management unit 302 to the web browser as it is.

In step S719, the extension application 240 transmits an icon information update notification to the application management unit 302 to register the icon of the registered print form, and terminates the application servlet. In step S720, in response to the termination of the application servlet, the application management unit 302 performs the VM termination processing. In step S721, the application management unit 302 performs icon update processing. The icon update processing is used to display a button under the name set in the button name 604 of FIG. 6 on the main menu screen. The application management unit 302 controls the UI control unit 303 to display the button of the set extension application on the main menu screen. The UI control unit 303 generates a button image, and associates the generated button image with the application ID of the extension application 240 to be activated and stores them. This allows identification which extension application 240 the user-selected icon corresponds to.

FIG. 8 illustrates an example of an HTML resource that a form print application, or extension application 240, provides for the web browser. FIG. 8 illustrates an example of the HTML resource but the HTML resource is not limited to that. In FIG. 8, a button name, file path information, print settings, and schedule settings are already set in the HTML resource. Before the registration of print settings by the extension application 240, the HTML resource is data where no setting values but setting items are stored. The fully set HTML resource illustrated in FIG. 8 is completed by executing the sequence illustrated in FIG. 7.

Setting data 801 is written to the storage 104 in response to a press of the "OK" button 602 on the setting screen 601 of the extension application.

The setting data 801 contains a button name 802, a setting value 804 about whether to display the pre-execution confirmation screen, and path information 805 about the file or folder to be printed, where the values set in the button name 604, the file path information 605, and the pre-execution confirmation screen display 606 on the setting screen 601 for the extension application 240 are reflected. In FIG. 8, "CONTENT PRINTING" is set as the button name 802, and the pre-execution confirmation screen is set to be displayed.

The setting data 801 also contains settings 806 about a sheet size, duplex printing, a color mode, the number of copies, and a sheet feed unit, where the values set in the print settings 607 on the setting screen 601 for the extension application 240 are reflected. In FIG. 8, A4 is set as the sheet size, true as duplex printing, automatic determination as the color mode, 1 as the number of copies, and tray 2 as the sheet feed tray.

The setting data 801 also contains setting values 807 about whether to set schedules and the schedule on each day. FIG. 8 illustrates an example of the setting data 801 where printing is scheduled at 1:30 a.m. on Sunday and 5:45 p.m. on Monday, like the settings 609 on the setting screen 601 for the extension application 240. As printing is not scheduled from Tuesday to Saturday, the time information is blank there.

Figure 9:
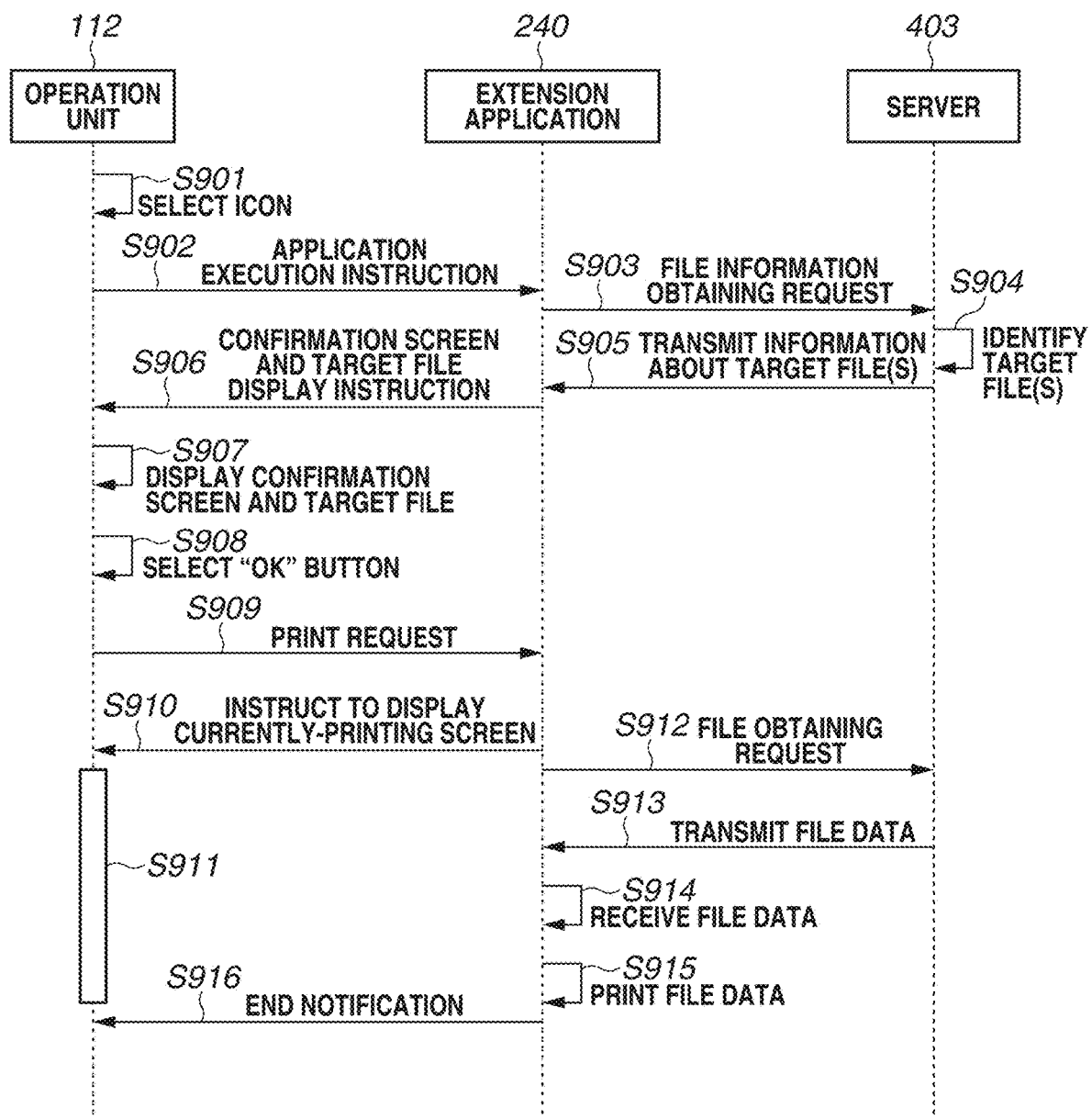
FIG. 9 is a sequence diagram illustrating processing when the extension application performs printing according to the present example embodiment.

Processing related to the execution of an extension application 240 will be now described with reference to FIG. 9. FIG. 9 is a sequence diagram illustrating processing when the user selects the button of an extension application 240 displayed on the screen of the image forming apparatus 401 to perform printing. In the present example embodiment, the extension application 240 may be referred to as a form print application.

In step S901, the operation unit 112 detects the selection of the icon of the extension application 240.

In step S902, the operation unit 112 issues an application execution instruction for the extension application 240. The operation unit 112 transmits the application execution instruction to the extension application 240 linked with the icon selected by the user.

In step S903, the extension application 240 receives the application execution instruction, and issues a file information obtaining request to the server 403 based on the path information linked with the icon.

In step S904, the server 403 receives the file information obtaining request from the extension application 240 and identifies a target file or files from among the files in the server 403. If a file is specified by the path information, the server 403 identifies the file at the set path. If a folder is specified by the path information, the server 403 identifies a plurality of files included in the folder as target files. If a URL is specified, the server 403 identifies a web page at the URL as a file to be printed (target file).

In step S905, the server 403 transmits information about the target file(s) identified in step S904 to the extension application 240. The information about the target file(s) to be transmitted in step S905 is information to be displayed on the operation unit 112 in step S906, which will be described below, such as the name(s) of the identified file(s), the stored date(s) and time(s) of the file(s), and the data size(s) of the file(s).

In step S906, in response to the receipt of the information about the target file(s) from the server 403, the extension application 240 issues a confirmation screen and target file display instruction to the operation unit 112.

In step S907, the operation unit 112 receives the confirmation screen and target file display instruction from the extension application 240, and displays a confirmation screen including the print settings made on the setting screen 601 and the information about the target file(S). The confirmation screen displayed on the operation unit 112 displays the name(s), the storage date(s) and time(s), and the data size(s) of the identified target file(s). The confirmation screen allows the user to check which file is to be printed on it. The confirmation screen also displays an "OK" button in addition to the information about the target file(s). The "OK" button is a button to give an instruction to execute printing using the user-selected extension application 240. The confirmation screen further display a "cancel" button. By selecting the "cancel" button, the user can return to the main menu screen without executing printing.

In step S908, the operation unit 112 detects the selection of the "OK" button on the confirmation screen.

In step S909, in response to the detection, the operation unit 112 transmits a print request to the extension application 240.

Figure 16:
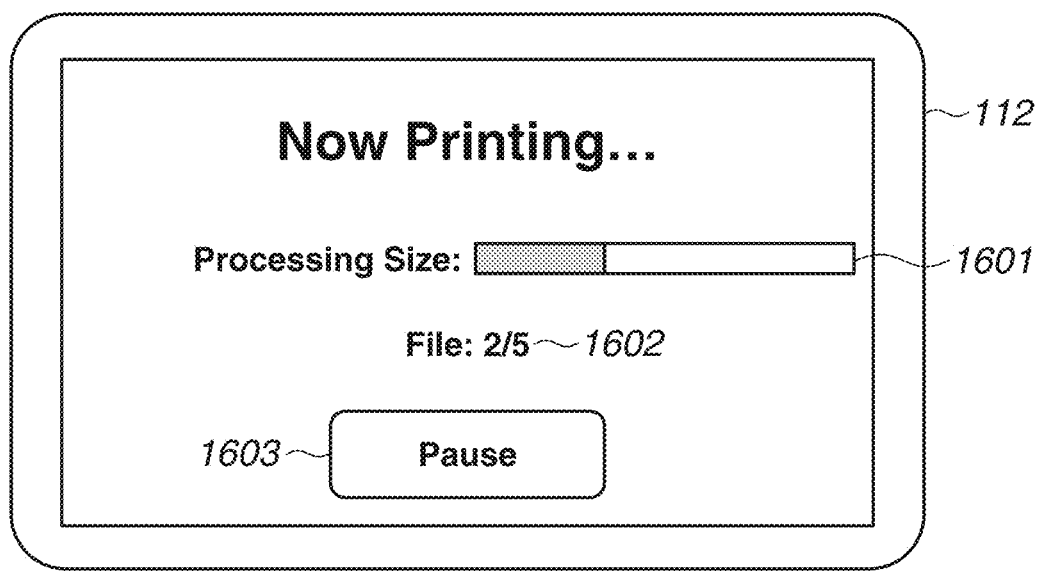
FIG. 16 illustrates an operation screen example of the extension application according to the present example embodiment.

In step S910, in response to the receipt of the print request from the operation unit 112, the extension application 240 instructs the operation unit 112 to display a now-printing screen. In step S911, the operation unit 112 displays the now-printing screen until an end notification is received in step S916. FIG. 16 illustrates an example of the now-printing screen. A progress bar 1601 indicates the progress of submission of the currently submitted document. A section 1602 indicates the number of files to be printed and the file number of the file currently being submitted. In this example, the section 1602 indicates that a total of five files are to be printed and the second file is currently being submitted. A button 1603 is intended to give an instruction to suspend job submission and terminate the extension application 240. The button 1603 is selected if the user wants to perform a scan or print other documents while the form print application is running. This enables the user to suspend the job being performed by the extension application 240, terminate the extension application 240, and use the image forming apparatus 401 to perform scanning or other operations.

In step S912, the extension application 240 issues a file obtaining request to the server 403. In step S912, the extension application 240 transmits an access request for the path set for the extension application 240 to the server 403. As described above, the path may be a file path or a folder path.

In step S913, in response to the reception of the file obtaining request from the extension application 240, the server 403 transmits data (file data) on the file(s) identified in step S904 to the extension application 240. Here, the image data to be actually printed is obtained.

In step S914, the extension application 240 receives the file data from the server 403. In step S915, the extension application 240 prints the received file data. With a plurality of target files, the processing of steps S914 and S915 is repeated a plurality of times. When printing a plurality of files, the extension application 240 starts to print the files in succession even before the completion of the data reception of all the files.

After the printing in step S915 ends, the extension application 240, in step S916, issues an end notification to the operation unit 112.

Processing for executing printing at a time set by the user's schedule setting will be now described.

Figure 13:
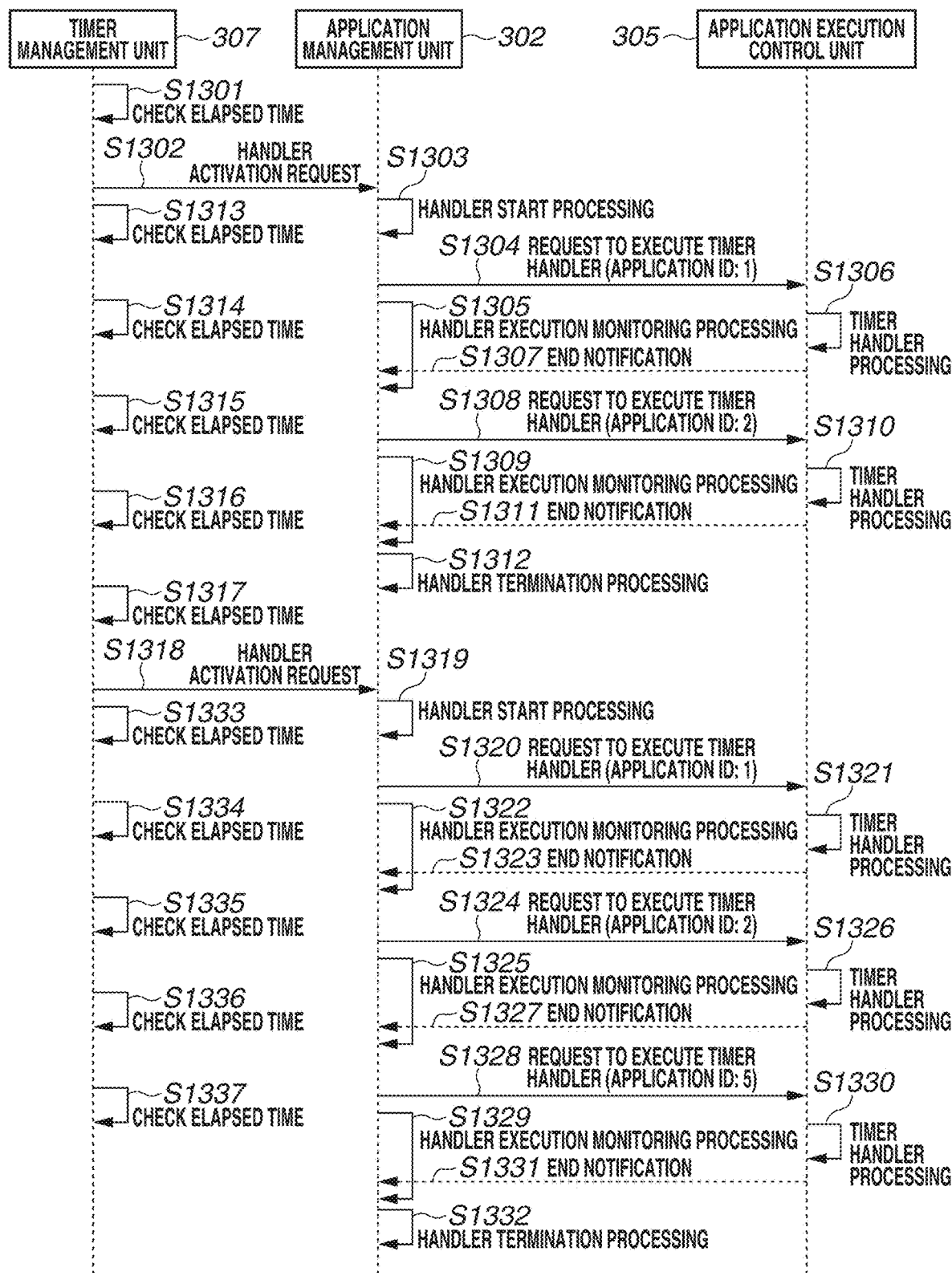
FIG. 13 is a sequence diagram illustrating a timer handler processing example according to the present example embodiment.

FIG. 13 is a diagram illustrating a sequence for performing timer handler processing of an extension application 240. This sequence is carried out with the extension application 240 installed on the image forming apparatus 401.

In step S1301, the timer management unit 307 regularly checks whether a time set as an interval has elapsed. The time set as the interval refers to the time defined by the interval information managed by the table illustrated in FIG. 12.

If the time set as the interval has elapsed since the activation of the timer handler of the extension application 240, then in step S1302, the timer management unit 307 issues a handler activation request to the application management unit 302. Here, the handler activation request also notifies the application management unit 302 of the application ID specifying the timer handler of which extension application 240 to activate. It here is assumed that the interval set with application IDs of 1 and 2 has elapsed.

In step S1303, in response to the reception of the handler activation request from the timer management unit 307, the application management unit 302 performs handler start processing. Here, the application management unit 302 activates the timer handlers of the extension applications 240 with the application IDs notified by the timer management unit 307 one by one. The handler start processing is processing for preventing sleep transition control so that the image forming apparatus 401 will not enter a sleep state during the timer handler processing to interrupt the timer handler processing.

In step S1304, the application management unit 302 requests the application execution control unit 305 to execute the timer handler of the extension application 240 specified by the application ID included in the handler activation request. In FIG. 13, the application management unit 302 requests the application execution control unit 305 to execute the timer handler of the extension application 240 with an application ID of 1 (issues a timer handler execution request).

In step S1305, the application management unit 302 performs handler execution monitoring processing of monitoring the execution of the timer handler executed by the application execution control unit 305. The handler execution monitoring processing will be described below with reference to FIG. 24.

In step S1306, in response to the reception of the timer handler execution request, the application execution control unit 305 executes the specified timer handler processing. Here, the timer handler determines whether the current time has reached the execution time of the job set by the schedule setting of the specified extension application 240. FIG. 13 illustrates a case where the set time has not yet come.

After the execution of the timer handler processing, in step S1307, the application execution control unit 305 notifies the application management unit 302 of the end of the timer handler processing (issues an end notification). In response to the reception of the end notification, the application management unit 302 ends the handler execution monitoring processing and controls execution of the timer handler with the next application ID included in the handler activation request. In FIG. 13, the application management unit 302 processes the timer handler of the extension application 240 with an application ID of 2.

In step S1308, the application management unit 302 requests the application execution control unit 305 to execute the timer handler of the extension application with an application ID of 2. The application execution control unit 305 activates the timer handler of the extension application 240 with the application ID instructed by the application management unit 302. In step S1309, the application management unit 302 starts the handler execution monitoring processing. Meanwhile, the activated handler determines whether the current time has reached the time set by the schedule setting of the extension application 240 with an application ID of 2. FIG. 13 illustrates a case where the time set by the schedule setting of the extension application 240 with an application ID of 2 has not yet come, either.

In step S1311, the application execution control unit 305 notifies the application management unit 302 of the completion of the timer handler processing. In step S1312, the application management unit 302 ends the handler execution monitoring processing started in step S1309 (handler termination processing). Ending the handler execution monitoring processing allows the image forming apparatus 401 to enter a sleep, which will cause the image forming apparatus 401 to perform the sleep transition control.

Steps S1313 to S1317 are polling processing performed at regular intervals. The timer management unit 307 is configured to periodically perform the polling processing at times previously scheduled by the OS 201 illustrated in FIG. 2. In the present example embodiment, the times are every 100 milliseconds, whereas the times can be set as appropriate depending on the timer precision for the timer management unit 307. The timer management unit 307 regularly checks the elapsed time. The elapsed time does not reach any of the interval times for the extension applications 240 registered in the interval information 1201 until step S1317, and the processing of issuing a handler activation request is not performed.

Steps S1317 to S1332 are operations after the lapse of the interval times for the extension applications 240 with application IDs of 1, 2, and 5. From step S1317 on, the timer handlers of the extension applications 240 with application IDs of 1, 2, and 5 are activated in order and perform processing. The processing of steps S1319 to S1323 is similar to that of steps S1303 to S1307. The processing of steps S1324 to S1327 is similar to that of steps S1308 to S1311.

In step S1328, the application management unit 302 requests the application execution control unit 305 to execute the timer handler of the extension application 240 with an application ID of 5. In step S1329, the application management unit 302 starts handler execution monitoring processing on the extension application 240 with an application ID of 5. In step S1330, the application execution control unit 305 activates the timer handler of the extension application 240 with an application ID of 5, and executes the timer handler processing. Like steps S1306 and S1310, the timer handler processing performed in step S1330 is processing of determining whether the time set by the schedule setting of the extension application has come. Again, the following description will be given on the assumption that the current time has not reached the time set by the schedule setting. In step S1331, the application execution control unit 305 notifies the application management unit 302 of the end of the timer handler processing. In step S1332, the application management unit 302 performs processing for terminating the timer handler.

In such a manner, the timer handlers for determining whether to perform printing using the extension applications 240 are executed at regular intervals, whereby the main processing of the extension applications 240 can be executed at the user-set times without making the extension applications 240 resident. Loading the extension applications 240 into the memory when a predetermined time has elapsed instead of making the extension applications 240 resident on the memory can reduce the memory space while the extension applications 240 are not loaded. Moreover, in FIG. 13, the timer handlers of a plurality of extension applications 240 are executed not simultaneously but in succession. This can prevent the simultaneous execution of the extension applications 240 and reduce the amount of memory space used at a time.

Figure 14:
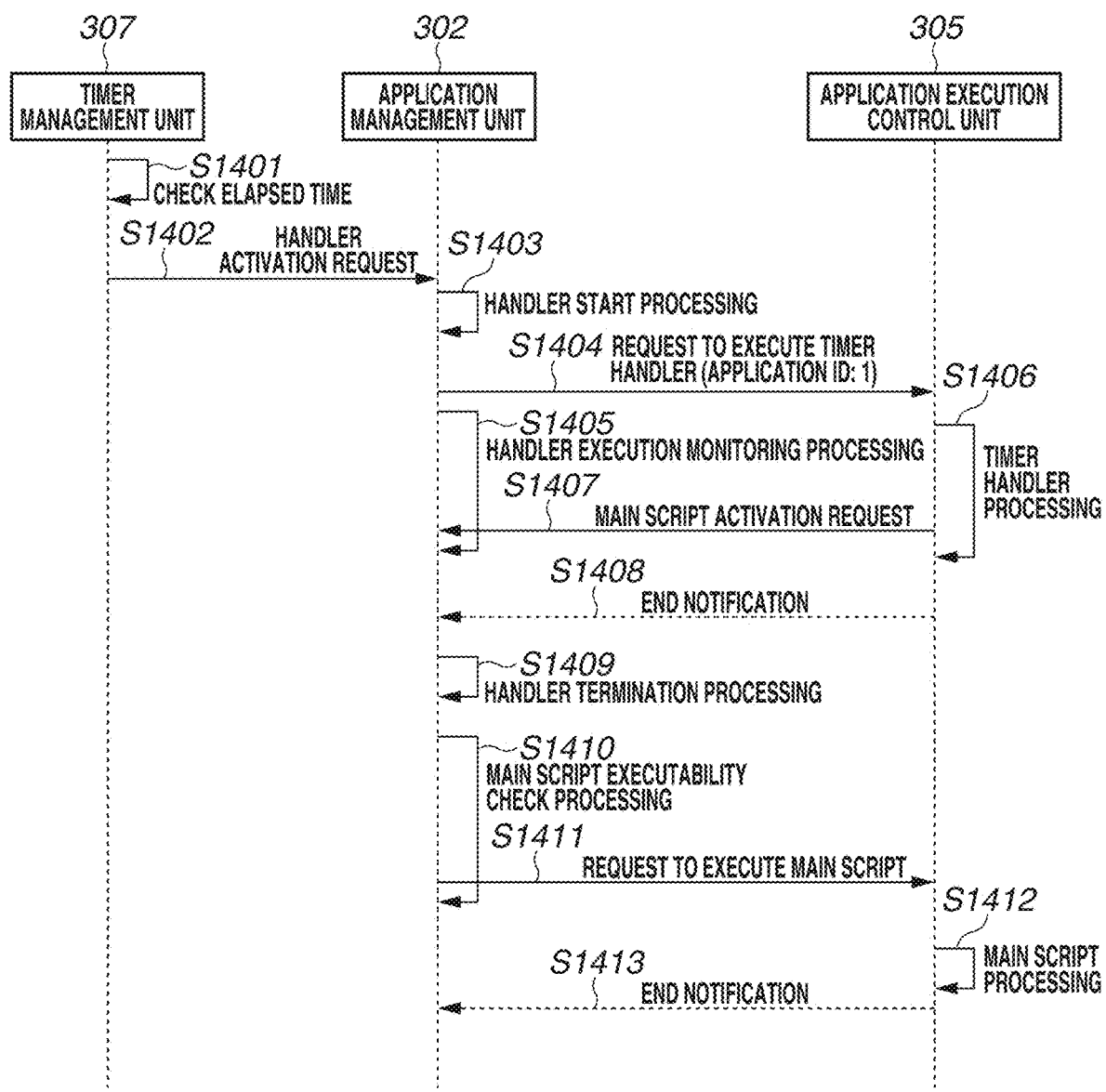
FIG. 14 is a sequence diagram illustrating processing when the extension application performs scheduled printing according to the present example embodiment.

Now, processing for a case where a scheduled time has come when a timer handler is activated will be described. FIG. 14 is a sequence diagram illustrating processing in performing scheduled printing using an extension application 240.

Steps S1401 to S1404 are similar to steps S1301 to S1304 in FIG. 13.

After a lapse of a predetermined time, in step S1401, the timer management unit 307 determines whether the set interval time has elapsed. If the set interval time has elapsed, then in step S1402, the timer management unit 307 requests the application management unit 302 to activate the timer handler of the extension application 240 for which the interval time has elapsed. In step S1403, the application management unit 302 executes the handler start processing. This can prevent the image forming apparatus 401 from entering the sleep state during the execution of the timer handler processing of the extension application 240. In step S1404, the application management unit 302 requests the application execution control unit 305 to execute the timer handler of the extension application 240 with an application ID of 1, which is the application ID notified by the timer management unit 307. In step S1405, the application management unit 302 starts the handler execution monitoring processing.

In step S1406, the application execution control unit 305 performs the timer handler processing of the form print application as the extension application 240. In step S1406, the application execution control unit 305 executes the timer handler of the extension application 240 to determine whether the scheduled time has come.

FIG. 14 illustrates a case where the time obtained from the RTC 115 of the image forming apparatus 401 has passed the scheduled time. In step S1407, the application execution control unit 305 issues a main script activation request to the application management unit 302 to perform form printing. Here, the application execution control unit 305 specifies the application ID to identify the extension application 240.

In step S1408, the application execution control unit 305 notifies the application management unit 302 of the end of the timer handler processing. In step S1409, the application management unit 302 terminates the timer handler processing based on the notification from the application execution control unit 305.

In step S1410, in response to the reception of the main script activation request, the application management unit 302 checks the executability of the main script of the extension application 240 with the specified application ID (main script executability check processing). This processing is intended to adjust the execution timing of the main script to prevent the extension application 240 from being unexpectedly activated, which will interfere with operations of the image forming apparatus 401 being performed by the user. For example, in checking the executability of the main script, the application management unit 302 determines whether the user is operating the operation unit 112. If the user is operating the operation unit 112, the application management unit 302 does not transmit a main script execution instruction until a predetermined time out of operation elapses. In step S1410, the application management unit 302 also checks whether the application execution control unit 305 is not executing the main script of another extension application 240. This processing is intended to prevent the main scripts of a plurality of extension applications 240 from being simultaneously executed.

The executability of the main script may be checked by methods other than the foregoing. In some embodiments, for example, the application management unit 302 detects whether the image forming apparatus 401 is printing or reading a document. In other embodiments, the application management unit 302 detects the presence of a person in front of the image forming apparatus 401 using a not-illustrated human detection sensor.

In step S1410, if the main script is determined to be executable, then in step S1411, the application management unit 302 requests the application execution control unit 305 to execute the main script. In step S1412, the application execution control unit 305 executes the main script to perform the print processing (main script processing) illustrated in step S909 and the subsequent steps in FIG. 9. After the completion of the main script processing, in step S1413, the application execution control unit 305 notifies the application management unit 302 of the end of the execution of the main script.

Such a control enables printing by loading the main script of the extension application 240 at timing determined to execute the main script by the schedule setting, instead of maintaining the main script loaded in the memory all the time.

Figure 15:
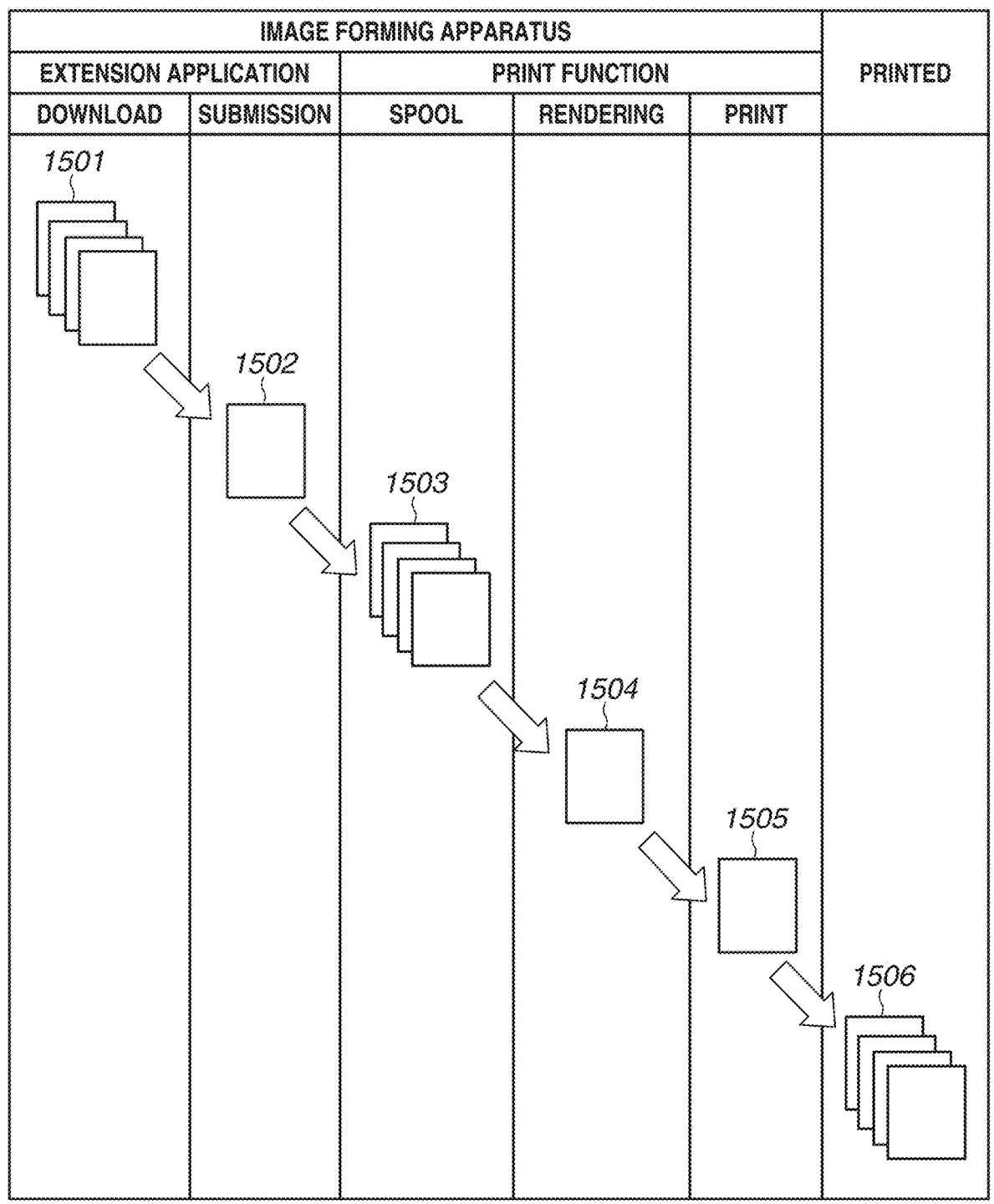
FIG. 15 is a schematic diagram illustrating a processing state of individual pages during print processing by the extension application according to the present example embodiment.

A processing procedure in printing files identified by a registered path will be now described with reference to the schematic diagram of FIG. 15. FIG. 15 is a schematic diagram illustrating an example of how pages are processed in printing a multi-page document. The extension application 240 downloads a document including a plurality of pages from a registered server (1501). The extension application 240 submits data being downloaded to an interface for the print function to refer to (1502). The extension application 240 spools the data submitted to the interface into a memory to be used by the print function (1503). The extension application 240 ensures the free space in the memory for spooling, and passes the data. The print function reads the spooled data and renders the data to generate a bitmap image (1504). The print function prints the bitmap image generated by the rendering. The image forming apparatus 401 discharges image-printed sheets and completes the processing (1506). The extension application 240 is terminated at the point in time when all the downloaded data is submitted. The spooled data continues to be printed even after the termination of the extension application 240.

Now, details of print-related processing using an extension application 240 will be described with reference to flowcharts.

Figure 21:
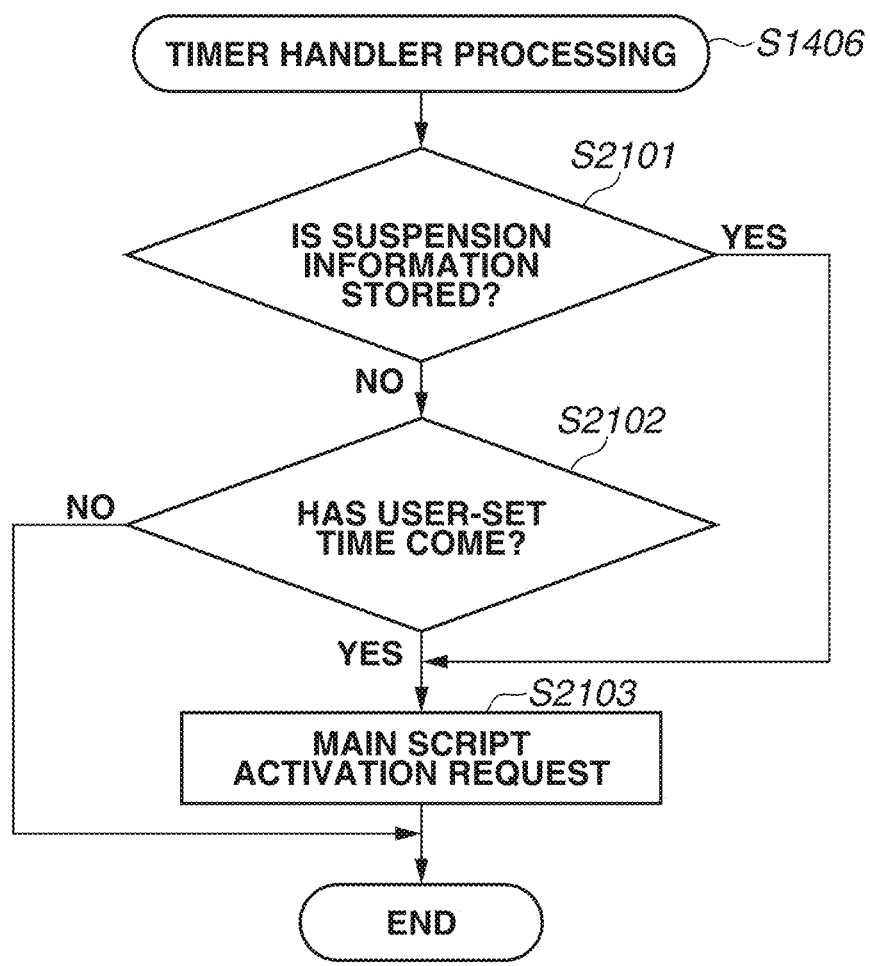
FIG. 21 is a flowchart illustrating the timer handler processing performed by the extension application according to the present example embodiment.

FIG. 21 is a flowchart illustrating the timer handler processing by the content print application illustrated in step S1406 of FIG. 14. The processing illustrated in this flowchart is performed by the CPU 101 running the program illustrated as the handler script 1004 in the installation data of the extension application 240 in FIG. 10.

In step S2101, the CPU 101 determines whether suspension information is stored. The suspension information is information recorded in step S1906 of FIG. 19. The suspension information indicates up to which file printing has been completed if the printing by the extension application 240 is suspended.

The suspension information will be described with reference to FIG. 22. FIG. 22 illustrates an example of the suspension information. Three files file1.pdf, file2.pdf, and file3.pdf here are stored in the folder corresponding to the user-set path. The extension application 240 downloads and prints the three files in order. Now, it is assumed that the extension application 240 has completed downloading the files file1.pdf and file2.pdf and printing file1.pdf, and a suspension instruction is given in the middle of printing file2.pdf. Here, the image forming apparatus 401 completes printing file2.pdf and terminates the extension application 240. As illustrated in FIG. 22, the printing-completed file1.pdf and file2.pdf are stored in the suspension information. Storing which files have completed being printed as the suspension information enables the CPU 101 to refer to the suspension information and check up to which file the printing is completed in response to the activation of the timer handler after the suspension of the extension application 240.

In step S2101, if the suspension information is determined to be stored (YES in step S2101), the processing proceeds to step S2103. If there is no suspension information stored (NO in step S2101), the processing proceeds to step S2102.

In step S2102, the CPU 101 obtains the current day and time from the RTC 115, and determines whether a user-set time has come between the previous activation of the timer handler and the present activation of the timer handler. The user-set time refers to the time set by a schedule setting made on the setting screen 601 illustrated in FIG. 6. The CPU 101 determines whether a printing schedule specifying the same day as that obtained from the RTC 115 is registered. If a printing schedule specifying the same day as that obtained from the RTC 115 is registered, the CPU 101 determines whether the set time has come between the previous activation of the timer handler and the present activation of the timer handler. The CPU 101 here determines whether the set time has come between the set interval before the time obtained from the RTC 115 and the time obtained from the RTC 115.

If the set time has come (YES in step S2102), the processing proceeds to step S2103. On the other hand, if the set time has not yet come (NO in step S2102), the processing illustrated in FIG. 21 ends.

In step S2103, the CPU 101 requests the application management unit 302 to activate the main script. The processing ends.

As illustrated in FIG. 21, if there is suspension information upon activation of the timer handler, the suspended print processing can be resumed by activating the main script. In the processing of step S2102, the CPU 101 may check for a print request by communicating with an external information apparatus instead of the lapse of a predetermined time. This can provide a print function linked with the external information apparatus.

Next, processing of checking the executability of the main script of the extension application to be performed when the application management unit 302 is instructed to execute the main script by the application execution control unit 305 will be described with reference to the flowchart of FIG. 23. This processing details the processing performed in step S1410 of FIG. 14.

Figure 23:
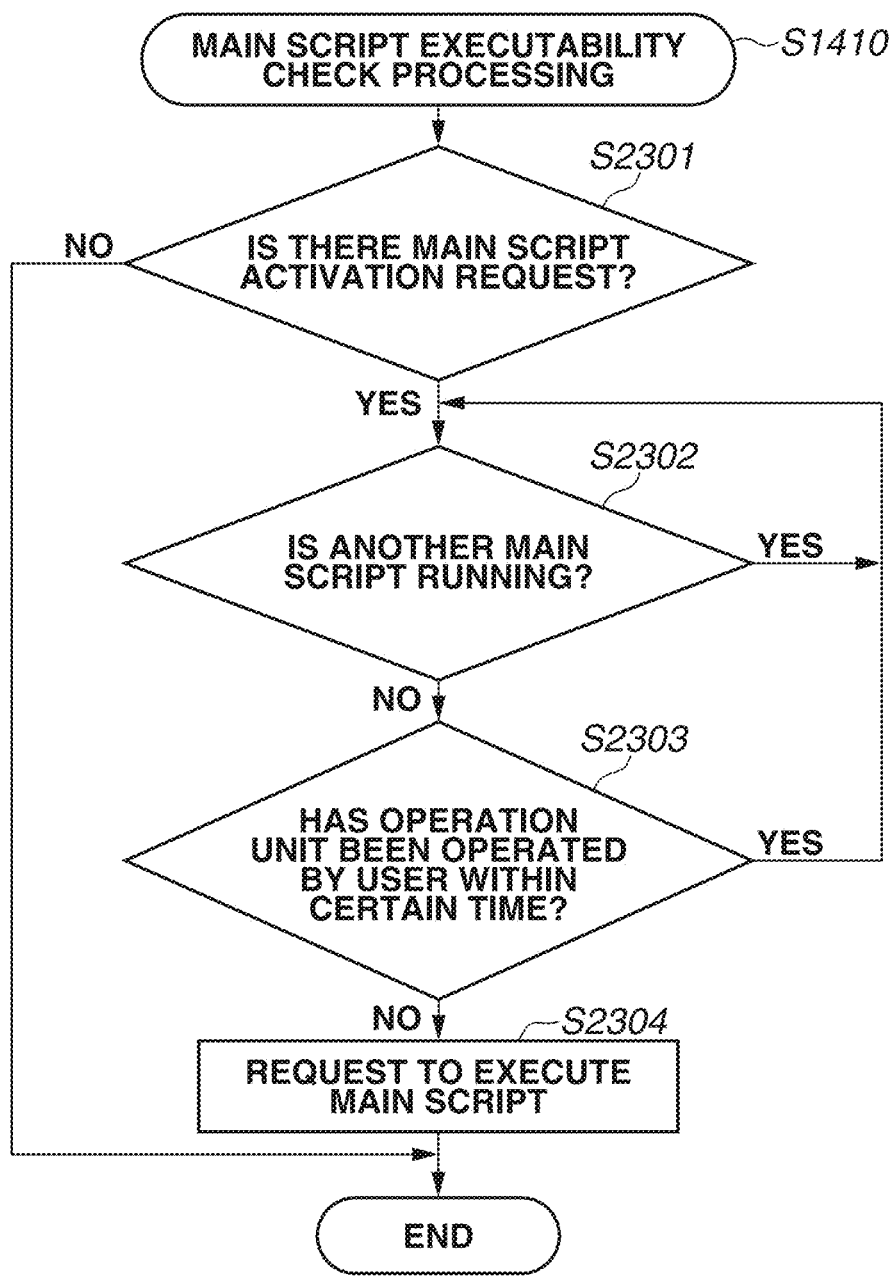
FIG. 23 is a flowchart illustrating main script executability check processing according to the present example embodiment.

The processing illustrated in FIG. 23 is performed by the CPU 101 running a program stored in the image forming apparatus 401 as a native program. This processing is intended to perform control for the extension application 240 not to perform printing while the main script of an application different from the extension application 240, which is not instructed to be executed, is running or while the user is operating the image forming apparatus 401.

In step S2301, the CPU 101 checks for a main script activation request. If there is a main script activation request (YES in step S2301), the processing proceeds to step S2302. If not (NO in step S2301), the processing illustrated in FIG. 23 ends.

In step S2302, the CPU 101 determines whether another main script is already running. If another main script is running (YES in step S2302), the processing returns to step S2302. If no other main script is running (NO in step S2302), the processing proceeds to step S2303. To reduce the amount of memory where the main script is loaded, the CPU 101 repeats the processing of step S2302 until another main script is terminated so that the processing of step S2303 will not be performed while another main script is running.

In step S2303, the CPU 101 determines whether the operation unit 112 has been operated within a certain time. If the operation unit 112 has been operated by the user within a certain time (YES in step S2303), the processing returns to step S2302. If the operation unit 112 has not been operated within a certain time (NO in step S2303), the processing proceeds to step S2304. If a predetermined time has not elapsed since the user's last operation, the user may still be operating the image forming apparatus 401. The CPU 101 therefore repeats steps S2302 and S2303 until the user finishes operating the image forming apparatus 401. The CPU 101 executes the main script after the user finishes using the image forming apparatus 401.

In step S2304, the CPU 101 controls the application management unit 302 to request the application execution control unit 305 to execute the main script.

Such a control can prevent the extension application 240 from being activated during a user operation to interfere with the user operation, and can reduce memory use by preventing a plurality of main scripts from being simultaneously executed.

Next, processing performed by the main script of the extension application 240 will be described.

Figure 20:
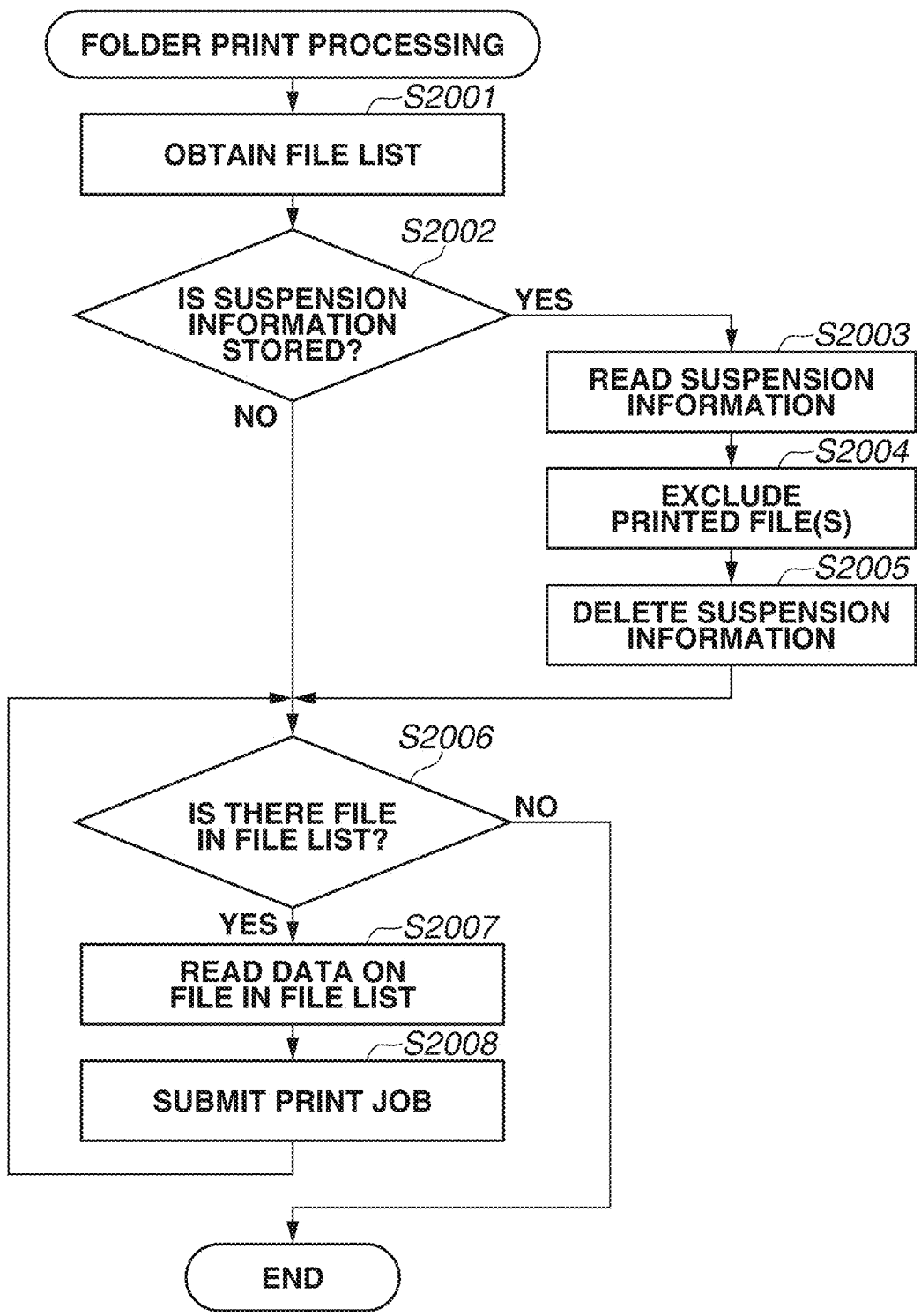
FIG. 20 is a flowchart illustrating folder print processing performed by the extension application according to the present example embodiment.

FIG. 20 is a flowchart illustrating folder print processing by the content print application. The following processing is performed by the CPU 101 executing the main script 1002 stored in the installation data on the extension application 240 illustrated in FIG. 10.

In step S2001, the CPU 101 initially obtains a list (file list) of files in the folder identified by the set path. For example, if there are three files file1.pdf, file2.pdf, and file3.pdf in the folder identified by the set path, the CPU 101 obtains the filenames of the three files.

In step S2002, the CPU 101 determines whether suspension information is stored. If suspension information is stored (YES in step S2002), the processing proceeds to step S2003 to print a file or files left unprinted in the folder due to the suspension. If there is no suspension information (NO in step S2002), the processing proceeds to step S2006.

In step S2003, the CPU 101 reads the suspension information.

In step S2004, the CPU 101 excludes a file or files matching a printed file list included in the suspension information from the file list obtained in step S2001. Suppose, for example, that the CPU 101 obtains the filenames "file1.pdf", "file2.pdf", and "file3.pdf" in step S2001. Suppose also that the filenames "file1.pdf" and "file2.pdf" are stored in the suspension information obtained in step S2002. In such a case, it can be seen that file1.pdf and file2.pdf are already printed among the three files listed in the file list obtained in step S2001. The CPU 101 therefore deletes "file1.pdf" and "file2.pdf" from the file list obtained in step S2001. As a result, file3.pdf is left as a file to be printed.

In step S2005, the CPU 101 deletes the suspend information from the storage 104.

In step S2006, the CPU 101 determines whether the file list includes any files. If any files are included (YES in step S2006), the processing proceeds to step S2007 to perform printing. On the other hand, if there are no files to be printed (NO in step S2006), the processing illustrated in FIG. 20 ends. The CPU 101 terminates the main script of the extension application in response to the completion of downloading the file(s) in the user-specified path and writing the data to the interface that the print function can refer to.

If there is no suspend information stored, the CPU 101 performs the processing of steps S2006 to S2008 on the files listed in the file list in order, starting at the file of which the filename is listed at the beginning of the file list.

In step S2007, the CPU 101 reads data on the file listed in the file list. For example, if "file3.pdf" is left in the file list as described above, the CPU 101 reads file3.pdf in the user-specified folder path. In step S2007, the CPU 101 starts to download the file.

In step S2008, the CPU 101 generates a print job based on the data on the downloaded file and the print settings made by the user. The CPU 101 then submits the generated print job to the native application controlling the print function of the image forming apparatus 401.

Such a control enables skipping printed files and printing remaining files if the folder print processing by the content print application is suspended.

Now, processing in a case where the user gives a suspension instruction for the extension application 240 while the extension application 240 is printing image data will be described.

Figure 17:
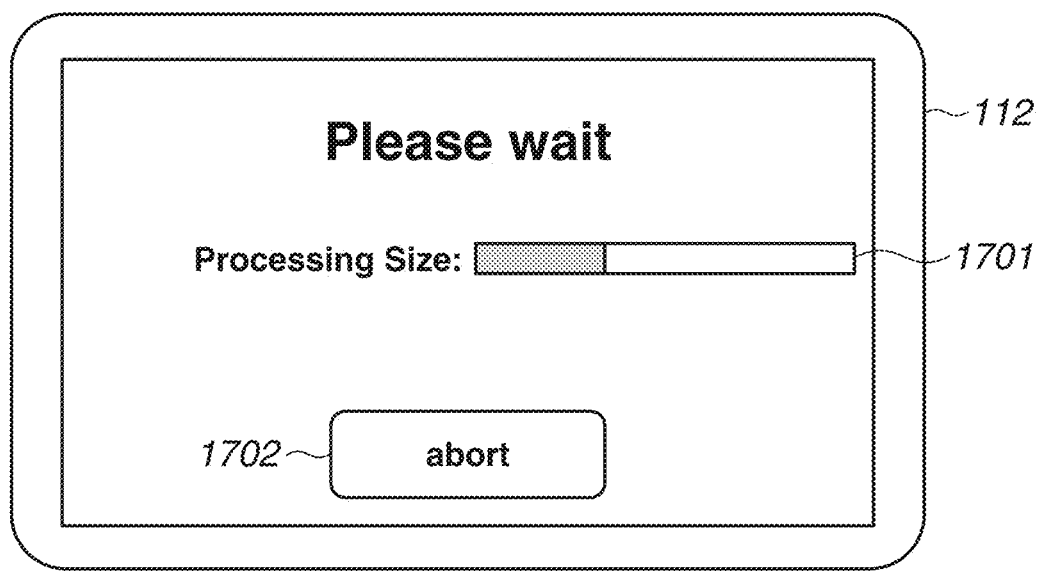
FIG. 17 illustrates an example of a screen displayed when the extension application stops printing according to the present example embodiment.

FIG. 17 illustrates an example of a suspension processing screen displayed in response to a press of the "pause" button 1603 of FIG. 16 to give a suspension instruction for the printing by the extension application 240. If the extension application 240 is stopped in the middle of submitting data on a multi-page document (1502 in FIG. 15), the document is left printed halfway. When the "pause" button 1603 is pressed, the image forming apparatus 401 therefore does not immediately suspend the extension application 240, but waits until the entire data on the file downloaded halfway finishes being submitted before terminating the extension application 240.

The image forming apparatus 401 submits the data on the last page of the file being printed to the interface with the print function, and hides the suspension processing screen illustrated in FIG. 17. After the suspension processing screen is hidden, the operation unit 112 displays the main menu screen for selecting a function to be used from among the plurality of functions such as the copy, print, and scan functions, a setting screen for any of the foregoing functions, or a screen for accepting information for user authentication.

A progress bar 1701 on the suspension processing screen indicates the progress of submission of the document currently being submitted. The extension application 240 is terminated at the point in time when the submission is completed. An "abort" button 1702 is a button for immediately stopping the extension application 240 if the printing may be left incomplete.

If the "abort" button 1702 is selected, the extension application 240 is aborted even during data submission.

If the extension application 240 is aborted, the image forming apparatus 401 prints the file being printed up to the last page and ends the printing by the extension application 240.

Figure 18:
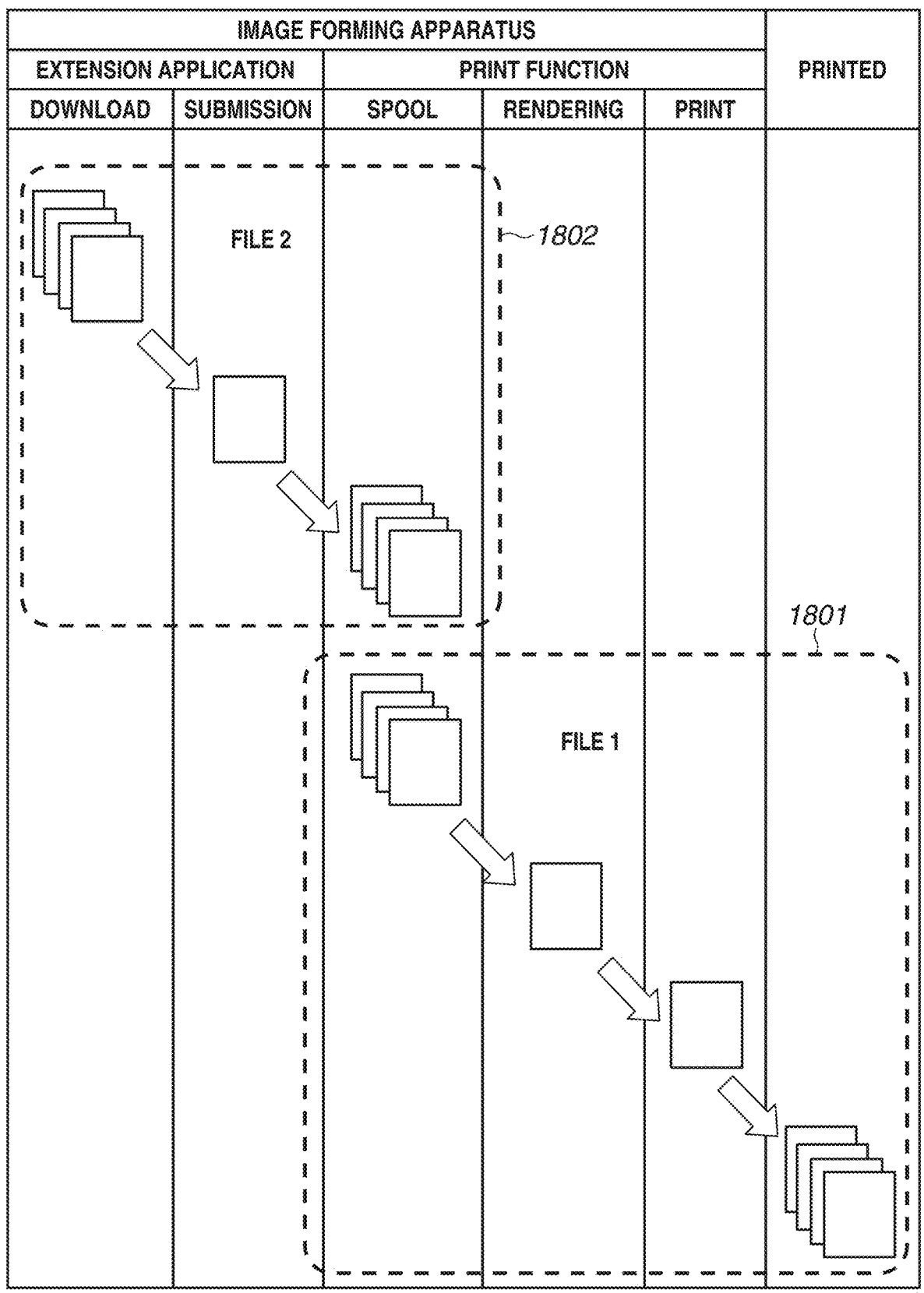
FIG. 18 is a schematic diagram illustrating the processing state of individual pages in printing a plurality of files by the extension application according to the present example embodiment.

FIG. 18 is a diagram illustrating how pages are processed in printing two files in the folder. File 1 is initially submitted, and file 2 is submitted after the end of the submission of file 1. Here, file 1 is still being printed, and file 2 is spooled in a print standby state. Suppose that a suspension instruction is given while file 1 is being printed and file 2 is being downloaded. In such a case, the image forming apparatus 401 prints file 1 up to the last page and does not print file 2. The image forming apparatus 401 then stores suspension information indicating that the printing of file 1 is completed.

Figure 19:
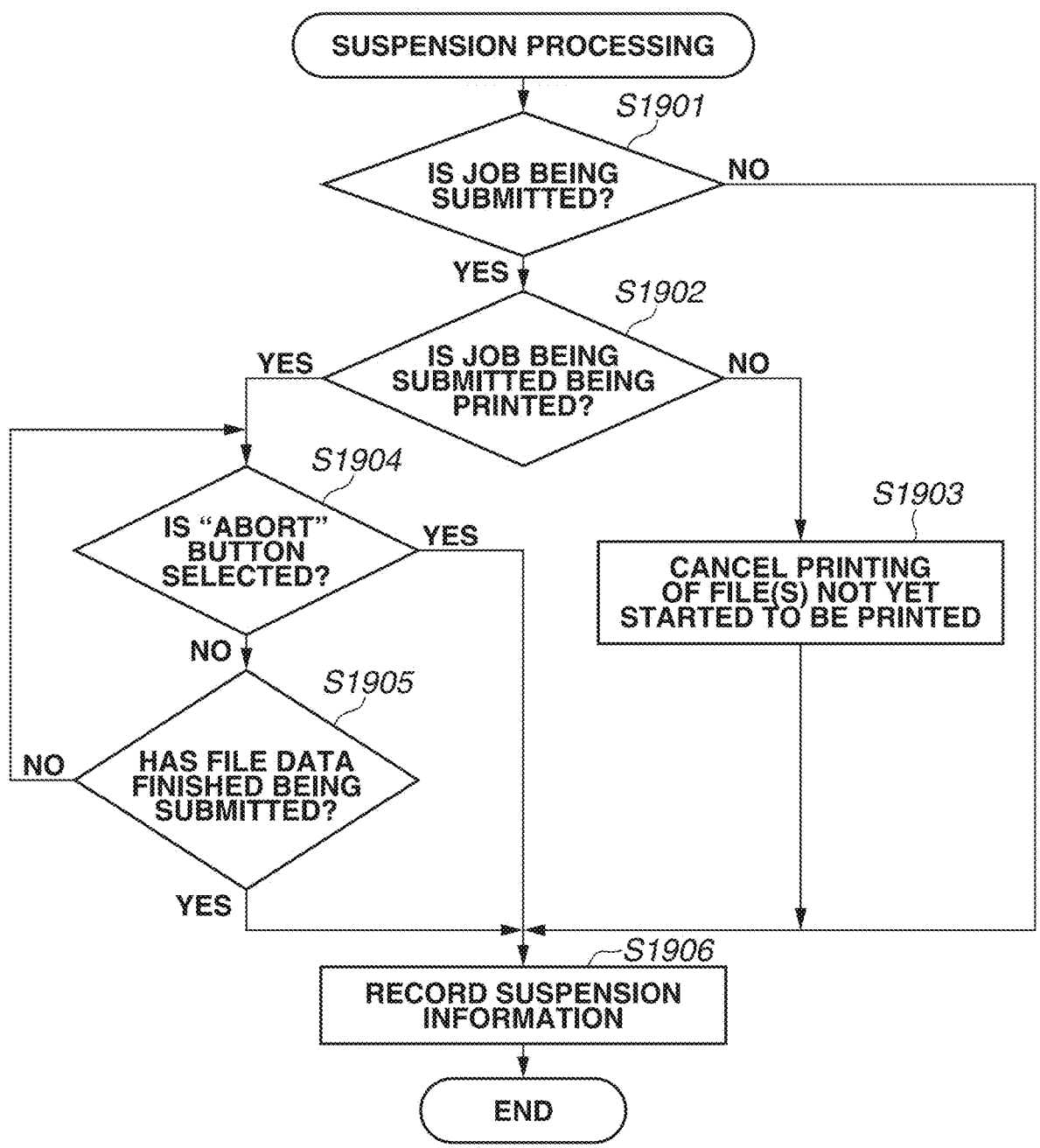
FIG. 19 is a flowchart illustrating suspension processing by the extension application according to the present example embodiment.

FIG. 19 illustrates a procedure of the suspension processing in response to the press of the "pause" button 1603 of FIG. 16. The processing illustrated in this flowchart is performed by the CPU 101 running the program illustrated as the main script 1002 of the extension application 240. In the present example embodiment, a job is generated for each file to be printed by the extension application 240. In other words, if there is a plurality of files in the folder identified by the user-set path, a plurality of jobs is generated in succession and printed in succession at a scheduled time that comes.

In step S1901, the CPU 101 initially determines whether a job is being submitted. In step S1901, the state where a job is being submitted refers to a state where the extension application 240 is downloading a file in the folder identified by the user-set path and writing the file to the interface with the print function. For example, in FIG. 18, a file 1801 has been completely submitted to the print function of the image forming apparatus 401. A file 1802 has been downloaded but not yet completely submitted to the print function of the image forming apparatus 401. In such a case, the CPU 101 determines in step S1901 that a job is being submitted. If no job is being submitted (NO in step S1901), the processing proceeds to step S1906.

On the other hand, if a job is being submitted (YES in step S1901), the processing proceeds to step S1902. In step S1902, the CPU 101 determines whether the job being submitted is being printed. For example, in FIG. 18, the job being submitted refers to the job for printing file 2. The job being printed refers to the job for printing file 1. In the case of FIG. 18, the CPU 101 determines that the job being submitted is not being printed.

If the job being submitted is being printed (YES in step S1902), the processing proceeds to step S1904. If the job being submitted is not being printed (NO in step S1902), the processing proceeds to step S1903.

In step S1903, the CPU 101 cancels the printing of the file being submitted. The processing proceeds to step S1906. For example, in the case of FIG. 18, the CPU 101 quits downloading the file 2. In step S1903, if there is a file or files that has/have been submitted but not yet started to be printed, the CPU 101 cancels the printing of the file(s) in addition to the file being submitted.

In step S1904, the CPU 101 determines whether the "abort" button 1702 is selected. If the "abort" button 1702 is selected (YES in step S1904), the processing proceeds to step S1906. If the "abort" button 1702 is not selected (NO in step S1904), the processing proceeds to step S1905.

In step S1905, the CPU 101 determines whether the file data has finished being submitted. That file data has finished being submitted means that the extension application 240 has completed obtaining image data on one file from the server 403 and finished submitting the image data to the interface with the printer function that is a native application.

If the job has not yet finished being submitted (NO in step S1905), the processing returns to step S1904. If the job has finished being submitted (YES in step S1905), the processing proceeds to step S1906.

In step S1906, the CPU 101 records a list (file list) of files on which the file data has finished being submitted in the storage 104 as suspension information of the content print application. The processing ends. Storing the list of files to be completely printed as the suspension information in step S1906 enables the extension application 240 to print the remaining data not printed due to the suspension after the suspension.

Figure 24:
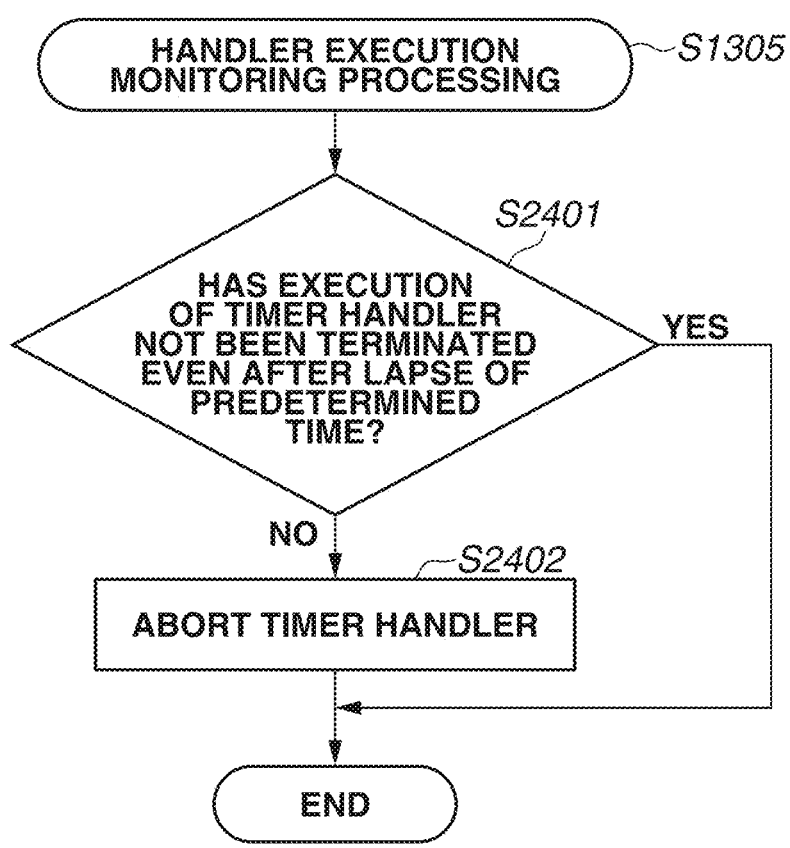
FIG. 24 is a flowchart illustrating handler execution monitoring processing according to the present example embodiment.

FIG. 24 illustrates a procedure of the handler execution monitoring processing in step S1305 of FIG. 13. A program for performing the processing illustrated in FIG. 24 is stored in the ROM 103 or the storage 104. The processing is performed by the CPU 101 running the program.

The CPU 101 performs the processing illustrated in step S2401 when a predetermined time has elapsed since the start of the processing.

In step S2401, the CPU 101 determines whether the execution of the timer handler requested of the application execution control unit 305 is terminated. If the execution is not terminated (NO in step S2401), the processing proceeds to step S2402. If the execution is terminated (YES in step S2401), the processing illustrated in FIG. 24 ends.

In step S2402, the CPU 101 aborts the timer handler. If the application management unit 302 gives an instruction to execute the timer handler of the extension application 240 and the execution of the timer handler is not completed even after a lapse of a predetermined time, the processing by the timer handler may not be properly performed. The CPU 101 thus starts the handler execution monitoring processing after the instruction to execute the timer handler is given. If the execution of the timer handler is not completed even after a lapse of a predetermined time from the start of the handler execution monitoring processing, the CPU 101 aborts the timer handler.

This handler execution monitoring processing can prevent a runaway of the timer handler of an extension application 240 from interfering with the execution of the timer handlers of other applications 240.

By such processing, if the printing by an extension application 240 is suspended by the user, the suspended printing can be resumed without waiting for the set time.

A second example embodiment will be described. In the first example embodiment, as illustrated in FIGS. 14 and 21, if the time obtained from the RTC 115 has passed a scheduled time, then in the timer handler processing (S1406), the application execution control unit 305 issues a request to activate the main script (step S1407). However, such a configuration can cause an error that the time when the main script is actually activated lags behind the scheduled time by one interval.

In the first example embodiment, the interval is assumed to be 10 minutes or more as illustrated in the rows 1202 to 1204 of FIG. 12. If the interval is reduced to the order of, e.g., seconds or milliseconds, the foregoing delay error becomes negligible. This, however, is not different from the state where the programs not running constantly are kept being loaded in the memory all the time as described in the Description of the Related Art section. On the other hand, activating the timer handlers at intervals of the order of seconds or milliseconds gives rise to an issue of increased power consumption during sleep, for example.

The second example embodiment for solving the foregoing issue will be described below.

Figure 25:
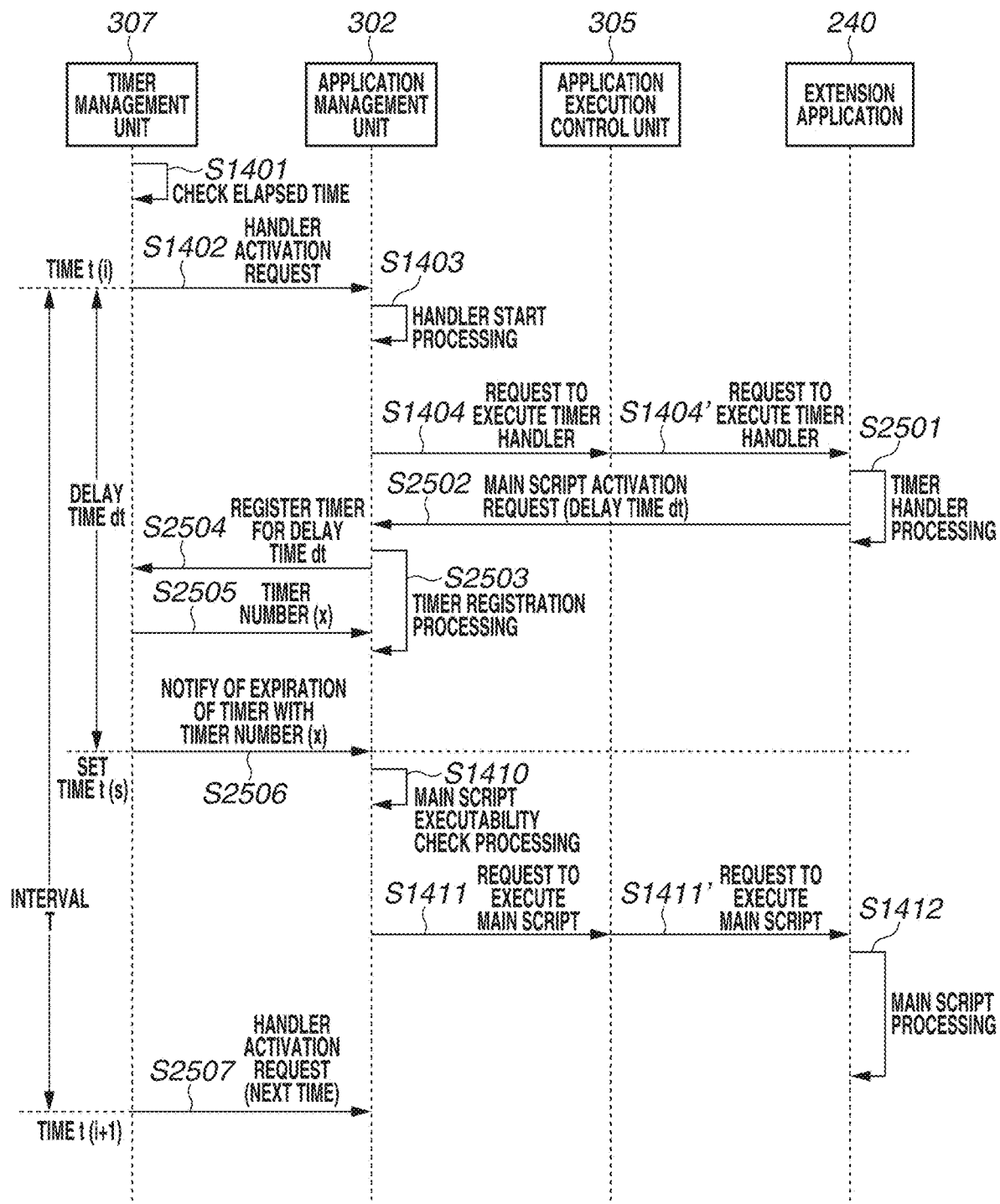
FIG. 25 is a sequence diagram illustrating processing during scheduled printing by an extension application according to a second example embodiment.

FIG. 25 is a sequence diagram illustrating processing during scheduled printing by an extension application 240 according to the second example embodiment. FIG. 25 illustrates processing to be performed at timing when a timer management unit 307 activates timer handler processing. In FIG. 25, the print time specified by the user is illustrated to come before the next execution of the timer handler processing.

In FIGS. 13 and 14, the timer handler processing and the main script processing are illustrated to be run on an application execution control unit 305. However, in a strict sense, as described with reference to FIG. 7, an application management unit 302 performs VM activation processing for running the extension application 240. The extension application 240 then executes various processes on the activated VM. While the VM activation processing and the VM termination processing illustrated in FIG. 7 are omitted in FIG. 25, it should be noted that the timer handler processing and the main script processing are executed as part of the processing by the extension application 240. The handler execution monitoring processing illustrated in FIGS. 13 and 14, which is not much relevant to the second example embodiment, is also omitted in FIG. 25.

In FIG. 25, step S1401 (check elapsed time), step S1402 (handler activation request), step S1403 (handler start processing), and step S1404 (request to execute timer handler) are similar to those illustrated in FIG. 14. A description thereof will be omitted. The request to execute the timer handler issued by the application management unit 302 in step S1404 is delivered to the extension application 240 via the application execution control unit 305 as a request to execute the timer handler in step S1404'.

To simplify the following description, the time of occurrence of the handler activation request in step S1402 will be denoted by t(i). The interval for the extension application 240 will be denoted by T. The time of occurrence of a handler activation request to be issued next time after a lapse of the interval T in step S2507 will be denoted by t(i+1).

Moreover, the set time of the scheduled printing set by a setting 609 illustrated in FIG. 6 will be denoted by t(s).

In step S2501, in response to the receipt of the request to execute the timer handler issued in step S1404', the extension application 240 performs the timer handler processing for the corresponding extension application 240.

During the timer handler processing in step S2501, in step S2502, the extension application 240 specifies a delay time dt based on a relationship between the foregoing time t(i), interval T, and set time t(s), and requests the application management unit 302 to activate the main script (issues main script activation request). Details will be described below.

In step S2503, in response to the receipt of the main script activation request issued in step S2502 with the delay time dt specified, the application management unit 302 performs timer registration processing for the delay time dt. Details will be described below.

During the timer registration processing in S2503, in step S2504, the application management unit 302 requests the timer management unit 307 to register a timer for the delay time dt so that the expiration of the timer is notified at the point in time when the delay time dt has elapsed.

In step S2505, the application management unit 302 receives a timer number (x) returned from the timer management unit 307 in response to the request. The processing where the timer management unit 307 checks the elapsed time is similar to that described above with reference to FIG. 13. A description thereof will thus be omitted.

If the lapse of the delay time dt is detected, then in step S2506, the timer management unit 307 notifies the application management unit 302 of the expiration of the timer with the previously notified timer number (x) (issues a timer expiration notification). In FIG. 25, a major part of the delay time dt appears to elapse between the issuance of the handler activation request in step S1402 and the return of the timer number (x) in step S2505. However, such a depiction is intended to facilitate the understanding of the sequence in the foregoing period. The period actually is sufficiently short compared with the delay time dt.

In step S1410, in response to the notification of the expiration of the timer with the timer number (x) in step S2506, the application management unit 302 checks the executability of the main script. If the main script is executable, then in step S1411, the application management unit 302 issues a request to execute the main script to the application execute control unit 305. Details will be described below. In step S1411', in response to the reception of the request to execute the main script, the application execution control unit 305 passes the request to the extension application. In step S1412, in response to the receipt of the request, the extension application performs main script processing. Step S1410 (check executability of main script), step S1411 (request to execute main script), and step S1412 (main script processing) are similar to those illustrated in FIG. 14.

Figure 26:
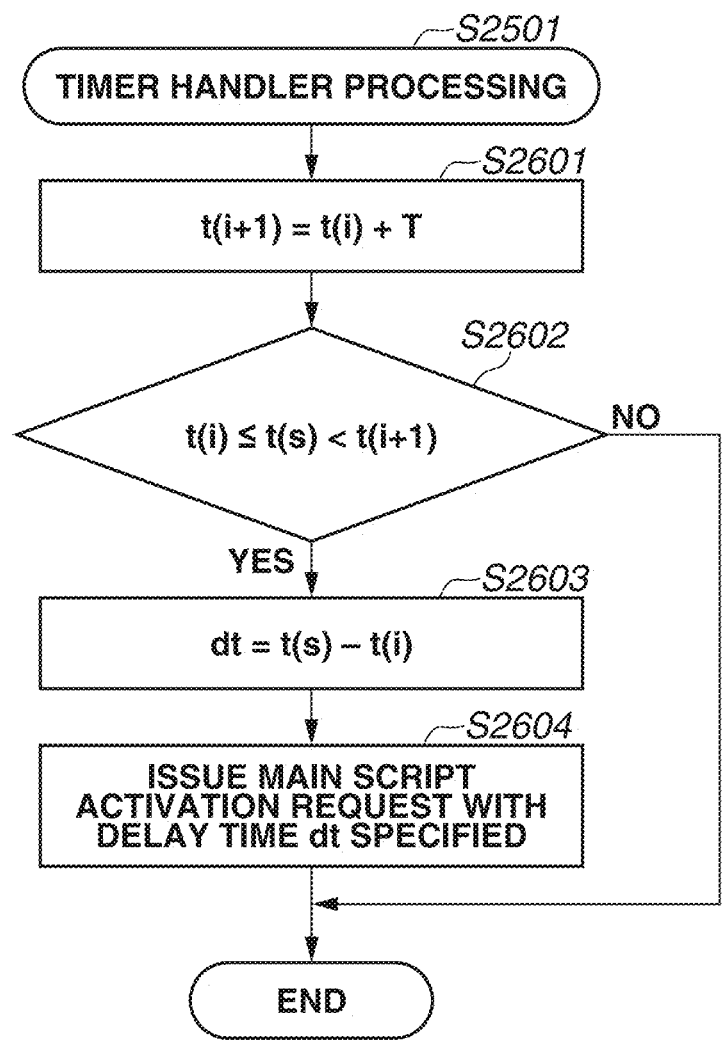
FIG. 26 is a flowchart illustrating timer handler processing according to the second example embodiment.

FIG. 26 is a flowchart illustrating the timer handler processing according to the second example embodiment.

The timer handler processing in step S2501 is performed in response to the receipt by the extension application 240 of the request to execute the timer handler from the application extension execution control unit 305 in step S1404'. Specifically, the timer handler processing is performed as described above in conjunction with the VMs 230 in FIG. 2.

In step S2601, the extension application 240 determines the next scheduled time t(i+1) to execute the timer handler (next scheduled handler execution time t(i+1)) from the current time t(i) obtained from the RTC 115 and the interval T.

In step S2602, the extension application 240 determines whether the set time t(s) of the scheduled printing is included in a period between the current time t(i) and the next scheduled handler execution time t(i+1). The extension application 240 compares the next scheduled handler execution time t(i+1) with the set time t(s) of the scheduled printing, and determines whether the time to perform printing comes before the next execution of the timer handler. If the set time t(s) of the scheduled printing is determined to not be included in the period (NO in step S2602), the timer handler processing ends. If the set time t(s) of the scheduled printing is determined to be included in the period (YES in step S2602), the processing proceeds to step S2603.

In step S2603, the extension application 240 subtracts the current time t(i) from the set time t(s) of the scheduled printing to determine the delay time dt.

In step S2604, the extension application 240 issues the main script activation request (step S2502) to the application management unit 302 with the determined delay time dt specified.

Figure 29:
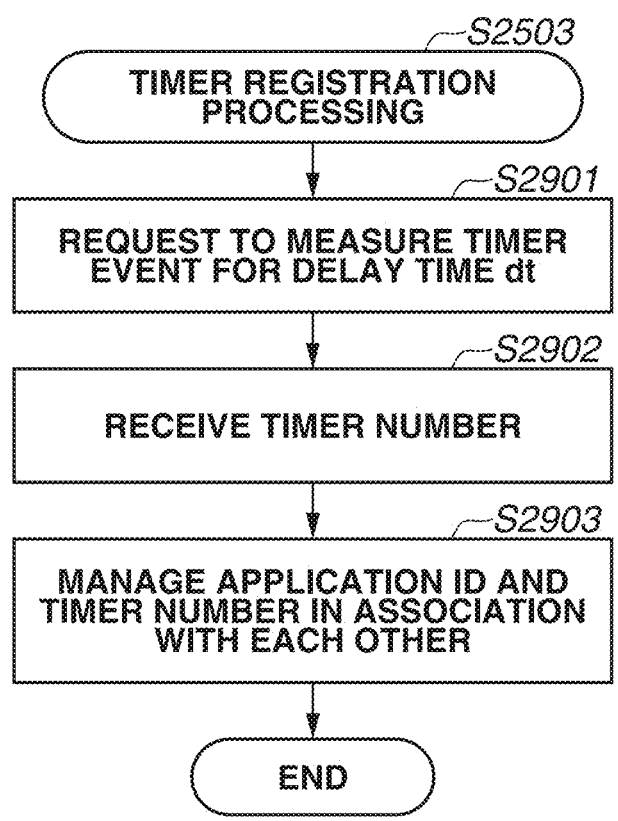
FIG. 29 is a flowchart illustrating timer registration processing for registering a delay time dt according to the second example embodiment.

FIG. 29 is a flowchart illustrating the timer registration processing for the delay time dt according to the second example embodiment. A program for performing the processing illustrated in FIG. 29 is stored in the ROM 103 or the storage 104, and the processing is performed by the CPU 101 running the program.

In step S2901, the application management unit 302 requests the timer management unit 307 to measure a timer event for the delay time dt.

In step S2902, the application management unit 302 receives a timer number as a return value of the request.

In step S2903, the application management unit 302 manages the application ID of the extension application to measure the delay time dt of and the timer number received as the return value in association with each other. FIG. 32 illustrates an example of a management table of application IDs and timer numbers for that purpose.

Figure 30:
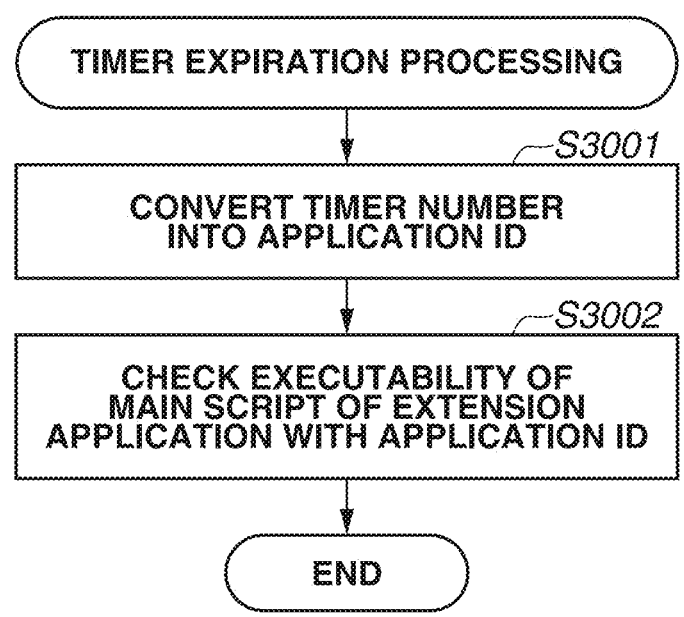
FIG. 30 is a flowchart illustrating processing when the delay time dt has elapsed according to the second example embodiment.

FIG. 30 is a flowchart illustrating processing when the delay time dt has elapsed in the second example embodiment. Like FIG. 29, a program for performing the processing illustrated in FIG. 30 is stored in the ROM 103 or the storage 104, and the processing is performed by the CPU 101 running the program.

The application management unit 302 has an event-driven structure. If an event occurs, the application management unit 302 is driven to perform processing linked with the event. Timer expiration processing illustrated in FIG. 30 is performed based on a timer expiration event notified by the timer management unit 307 in response to the expiration of the timer for the delay time dt registered by the processing illustrated in FIG. 29.

In step S3001, the application management unit 302 converts the timer number notified by the timer management unit 307 into an application ID based on the management table of application IDs and timer numbers illustrated in FIG. 32.

In step S3002, the application management unit 302 checks the executability of the main script related to the obtained application ID (step S1410). The timer expiration processing ends. As described above, if the main script is determined to be executable in step S3002 (S1410), the processing of step S1411 and the subsequent steps illustrated in FIG. 25 is preformed to start the scheduled printing by the extension application 240.

The foregoing configuration enables activation of the program with a minimum error with respect to the set time while reducing memory use.

However, while the foregoing configuration reduces the delay error, the printing can still be performed at a previously set time if the registration content such as the set time of the scheduled printing is changed during the measurement of the delay time. A configuration for solving such an issue will now be described.

Figure 27:
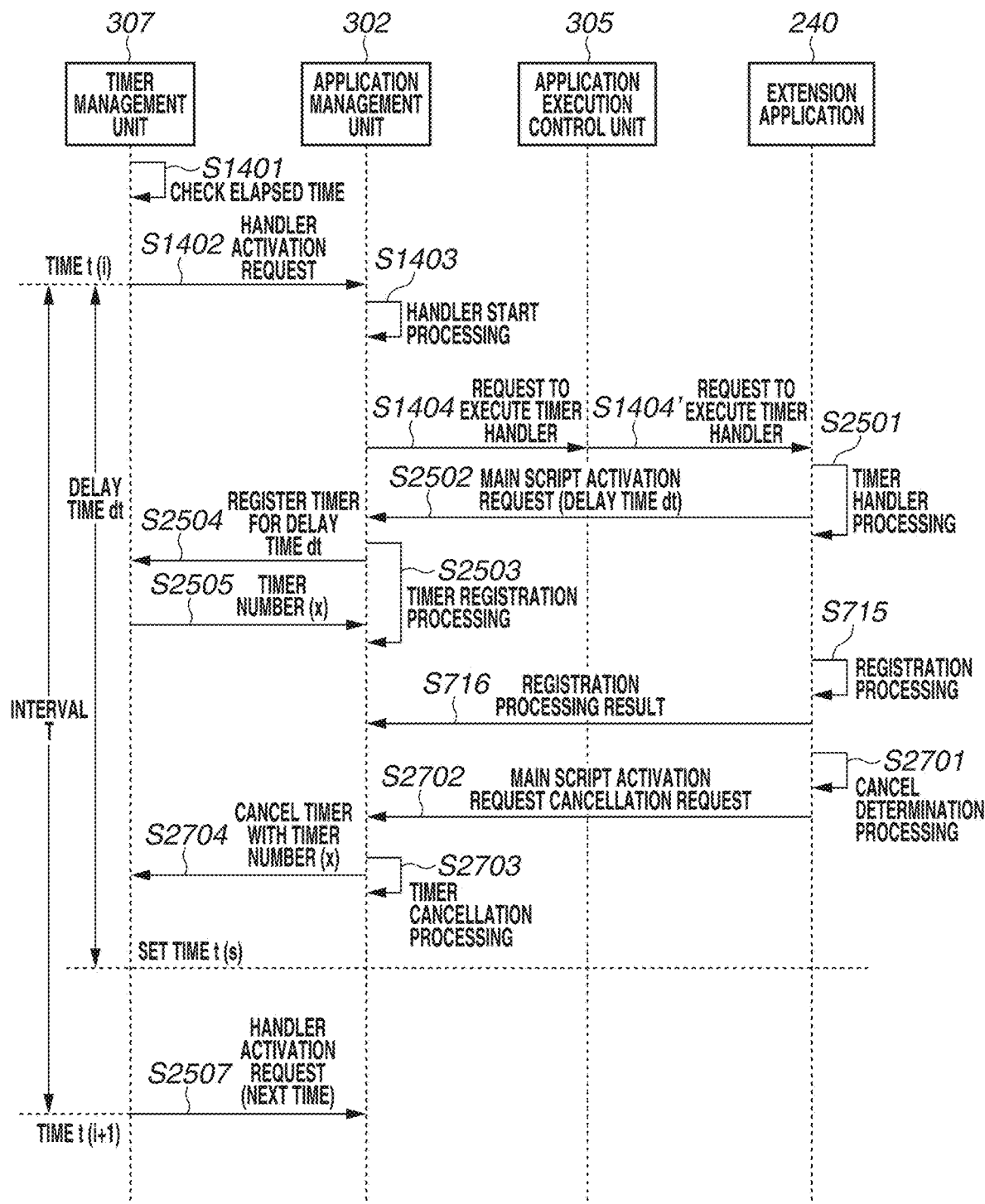
FIG. 27 is a sequence diagram illustrating a procedure for change made in registration content during delay time measurement processing according to the second example embodiment.

FIG. 27 is a sequence diagram illustrating a procedure for the case where the registration content is changed during the processing for measuring the delay time dt according to the second example embodiment.

In FIG. 27, step S1401 (check elapsed time) to step S2503 (timer registration processing) are similar to those in the sequence illustrated in FIG. 25. A description thereof will be omitted.

FIG. 27 illustrates a situation where the registration processing of step S715 illustrated in FIG. 7 is performed while the timer management unit 307 is measuring the delay time dt. The sequence before the registration processing of step S715 is similar to that in FIG. 7 and is thus omitted in FIG. 27. After the registration processing of step S715, in step S716, the servlet of the extension application 240 notifies the application management unit 302 of the registration processing result. In step S2701, the servlet of the extension application 240 performs cancel determination processing. Details will be described below.

If, in the cancel determination processing of step S2701, the servlet of the extension application 240 determines to cancel the main script activation request, then in step S2702, the servlet transmits a main script activation request cancellation request to the application management unit 302. Here, the servlet specifies the application ID for identifying the extension application 240.

In step S2703, in response to the receipt of the main script activation request cancellation request (step S2702), the application management unit 302 performs timer cancellation processing. Details will be described below.

In the timer cancellation processing of step S2703, the application management unit 302 requests the timer management unit 307 to cancel the timer registered in advance (issues a cancellation request). Details of this processing will also be described below. In step S2704, upon receiving the cancellation request, the timer management unit 307 cancels the measurement processing by the timer with the specified timer number. As a result, the timer management unit 307 no longer issues the timer expiration notification described with reference to FIG. 25.

Figure 28:
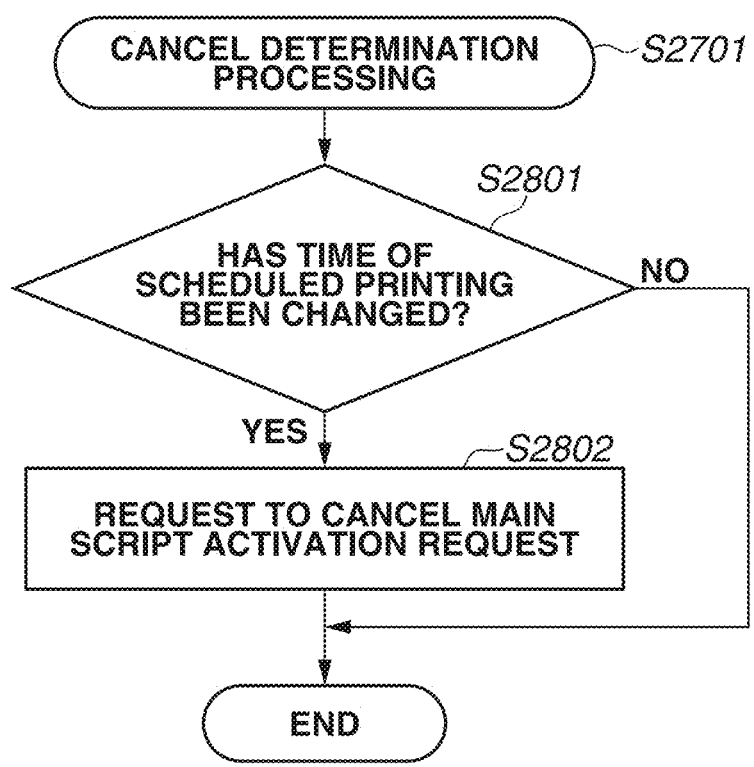
FIG. 28 is a flowchart illustrating cancel determination processing for a main script activation request according to the second example embodiment.

FIG. 28 is a flowchart illustrating the cancellation determination processing on a main script activation request according to the second example embodiment. The processing of FIG. 28 is a part of the processing by the program constituting the servlet of the extension application 240, and executed after the registration processing of step S715 illustrated in FIG. 27. Specifically, the processing is performed as described above in conjunction with the VMs 230 in FIG. 2.

In step S2801, the extension application 240 determines whether the time of the scheduled printing has been changed. If the time has not been changed (NO in step S2801), the cancellation determination processing simply ends. If the time of the scheduled printing has been changed or the setting itself has been deleted (YES in step S2801), the processing proceeds to step S2802.

In step S2802, the extension application 240 requests the application management unit 302 to cancel the main script activation request. Here, the extension application 240 specifies the application ID for identifying the extension application 240 (step S2702).

Figure 31:
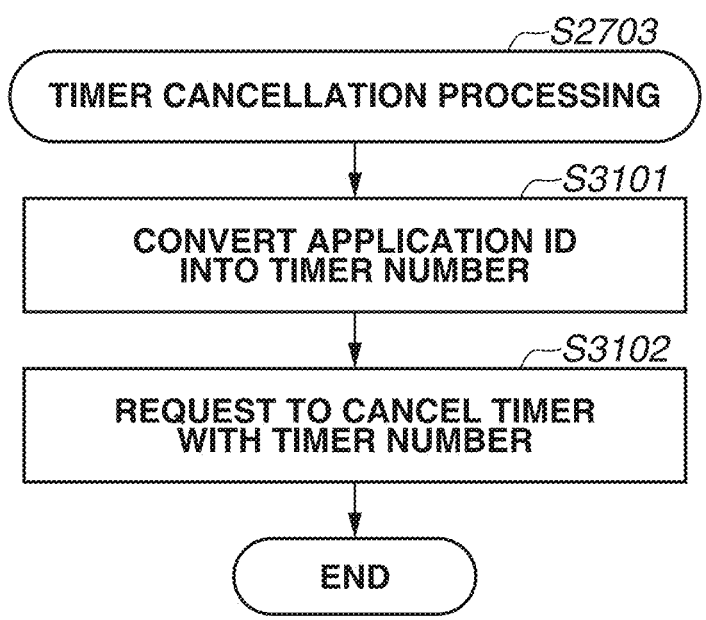
FIG. 31 is a flowchart illustrating processing for cancelling a timer for measuring the delay time dt according to one embodiment.

FIG. 31 is a flowchart illustrating processing of cancelling the timer for measuring the delay time dt. The processing of FIG. 31 is performed when the application management unit 302 is requested by the extension application 240 to cancel the main script activation request. The program for performing the processing illustrated in FIG. 31 is stored in the ROM 103 or the storage 104, and the processing is performed by the CPU 101 running the program.

In step S3101, the application management unit 302 converts the application ID specified by the request to cancel the main script activation request in step S2702 into a timer number based on the management table of application IDs and timer numbers illustrated in FIG. 32.

In step S3102, the application management unit 302 requests the timer management unit 307 to quit the processing for measuring the delay time dt specified by the obtained timer number. The timer cancellation processing ends.

Such a configuration can prevent the issue of execution of printing at a previously set time even if the set time of the scheduled printing is changed, for example.

Other Example Embodiments

In the foregoing example embodiments, the submission of data from the extension application 240 to the native application of the image forming apparatus 401 for performing printing is described to be suspended if the user gives an instruction to suspend the execution of the extension application 240. However, the printing in process may be suspended based on the user's suspension instruction.

For example, suppose that while the extension application 240 is performing printing with a setting to print ten copies of file1.pdf, the user gives the instruction to suspend the printing when the fifth copy is being printed. Here, the image forming apparatus 401 suspends the printing in response to the completion of printing the fifth copy. In other words, the printing is stopped without printing the sixth and subsequent copies. Up to which copy of which file has been printed is then stored in the suspension information generated in step S1906 of FIG. 19. In the foregoing case, information that up to the fifth copy of file1.pdf has been printed is stored in the suspension information.

In step S2001 of FIG. 20, the CPU 101 obtains the information about the number of copies to be printed set by the user in addition to the list (file list) of files in the folder. In step S2004, the CPU 101 determines how many copies of which file to print based on the information about the file list, the set number of copies to be printed, and the information indicating the filenames and the numbers of copies printed indicated by the suspension information. In step S2007 and the subsequent steps, the CPU 101 downloads the data on the files with the filenames stored in the file list, and resumes printing based on the downloaded data and the numbers of copies to be printed determined in step S2004.

In the foregoing case, the CPU 101 resumes printing at the sixth copy of file1.pdf.

In such a manner, in printing a plurality of copies of a file, the processing can be resumed at the printing of unprinted copies if the execution of the printing has been suspended in the middle.

Various example embodiments of the present disclosure can also be implemented by performing the following processing. The processing includes supplying software (program) for implementing the functions of the foregoing example embodiments to a system or an apparatus via a network or various storage media, and reading and executing the program code by a computer (or CPU or micro processing unit (MPU)) of the system or apparatus. In such a case, the computer program and the storage media storing the computer program constitute an example embodiment of the present disclosure.

The image forming apparatuses described in this specification, in performing processing to activate an extension application at a set time, enables the extension application to perform processing at timing when the set time has come while intermittently determining whether the set time has come.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-011931, filed Jan. 28, 2021, which is hereby incorporated by reference herein in its entirety.

What is claimed is:

1. An image forming apparatus that stores a first software module that causes the image forming apparatus to execute print process at a time set by a user, the image forming apparatus comprising:
    a controller configured to:
    transmit a notification to a second software module stored in the image forming apparatus periodically at each elapse of a predetermined time interval, wherein the second software module determines, in response to the notification, whether the controller activates the first software module based on current time and the predetermined time interval;
    receive, from the second software module that has determined that the controller activates the first software module, information indicating a timing at which the controller activates the first software module; and
    activate the first software module in accordance with the received information.

2. The image forming apparatus according to claim 1, wherein the second software module determines that the controller activates the first software module in a case that the time set by the user comes before the second software module receives a next notification.

3. The image forming apparatus according to claim 2, wherein the controller activates the first software module in a time period indicated by the received information.

4. The image forming apparatus according to claim 1,
    wherein the received information includes the timing to activate the second module, and
    wherein the controller is configured to activate the first software module at the timing specified by the received information.

5. The image forming apparatus according to claim 4, wherein the controller activates the first software module without activating the second software module.

6. The image forming apparatus according to claim 1, wherein the time set by the user is a time set by the user as a time to perform printing.

7. A method for controlling an image forming apparatus that stores a first software module that causes the image forming apparatus to execute print process at a time set by a user, the method comprising:
    transmitting a notification to a second software module stored in the image forming apparatus periodically at each elapse of a predetermined time interval,
    wherein the second software module determines, in response to the notification, whether the controller activates the first software module based on current time and the predetermined time interval;
    receiving, from the second software module that has determined that the controller activates the first software module, information indicating a timing at which the controller activates the first software module; and
    activating the first software module in accordance with the received information.

8. A non-volatile storage medium storing a program for causing a computer to perform a method for controlling an image forming apparatus that stores a first software module that causes the image forming apparatus to execute print process at a time set by a user, the method comprising:
    transmitting a notification to a second software module stored in the image forming apparatus periodically at each elapse of a predetermined time interval,
    wherein the second software module determines, in response to the notification, whether the controller activates the first software module based on current time and the predetermined time interval;
    receiving, from the second software module that has determined that the controller activates the first software module, information indicating a timing at which the controller activates the first software module; and
    activating the first software module in accordance with the received information.

9. The image forming apparatus according to claim 1, further comprising:
    an image forming unit, wherein the first software module causes the image forming unit to execute image forming process at the set time.

10. The image forming apparatus according to claim 1, wherein the second software module receives the notification without activating the first software module.

11. The image forming apparatus according to claim 1, wherein the first software module causes the image forming apparatus to execute the print process based on a file set by the user at the time set by the user.

* * * * *